US 7,753,605 B2

(12) United States Patent
McNestry et al.

(10) Patent No.: US 7,753,605 B2
(45) Date of Patent: Jul. 13, 2010

(54) TAPE DRIVE AND PRINTING APPARATUS

(75) Inventors: Martin McNestry, Heanor (GB); Keith Buxton, Mapperley Planes (GB); Philip Hart, Nuthall (GB)

(73) Assignee: Zipher Limited, Nottingham (GB)

( * ) Notice: Subject to any disclaimer, the term of this patent is extended or adjusted under 35 U.S.C. 154(b) by 7 days.

(21) Appl. No.: 12/401,821

(22) Filed: Mar. 11, 2009

(65) Prior Publication Data
US 2009/0190989 A1 Jul. 30, 2009

Related U.S. Application Data

(63) Continuation of application No. 11/533,957, filed on Sep. 21, 2006, which is a continuation of application No. 10/380,182, filed as application No. PCT/GB01/03965 on Sep. 5, 2001, now Pat. No. 7,150,572.

(30) Foreign Application Priority Data

| Sep. 11, 2000 | (GB) | ................................ | 0022206.7 |
| Nov. 22, 2000 | (GB) | ................................ | 0028465.3 |
| Jan. 9, 2001 | (GB) | ................................ | 0100493.6 |
| May 2, 2001 | (GB) | ................................ | 0111044.4 |

(51) Int. Cl.
*B41J 33/14* (2006.01)
*B41J 33/16* (2006.01)
*B41J 33/34* (2006.01)
*B41J 33/36* (2006.01)

(52) U.S. Cl. .................. 400/223; 400/234; 400/236
(58) Field of Classification Search ......... 400/191–250; B41J 33/14, 33/16, 33/17, 33/34, 33/36
See application file for complete search history.

(56) References Cited

U.S. PATENT DOCUMENTS 3,584,805 A   6/1971   Lee (Continued)

FOREIGN PATENT DOCUMENTS

DE   4215830   11/1993

(Continued)

OTHER PUBLICATIONS

Machine translation of FR 2783459 A1.*

(Continued)

*Primary Examiner*—Judy Nguyen
*Assistant Examiner*—'Wyn' Q Ha
(74) *Attorney, Agent, or Firm*—Beusse Wolter Sanks Mora & Maire, P.A.

(57) ABSTRACT

A tape drive for use in for example a transfer printing apparatus to drive a printer ribbon. The printer ribbon is mounted on two spools each of which is driven by a respective stepper motor. A controller controls the energization of the motor such that the ribbon is transported in at least one direction between spools mounted on the spool support. The controller is operative to energize both motors to drive the spools of ribbon in the direction of ribbon transport to achieve push-pull operations. Ribbon tension is monitored to enable accurate control of ribbon supply and ribbon take-up, the ribbon tension being monitored, for example, by monitoring power supply to the two stepper motors.

19 Claims, 18 Drawing Sheets

U.S. PATENT DOCUMENTS

| | | | |
|---|---|---|---|
| 3,606,201 A | 9/1971 | Petusky | |
| 3,610,496 A | 10/1971 | Parker | |
| 3,704,401 A | 11/1972 | Miller | |
| 3,781,490 A | 12/1973 | Phillips | |
| 3,836,831 A | 9/1974 | Van Heelsbergen | |
| 3,863,117 A | 1/1975 | Paschetto | |
| 3,889,893 A | 6/1975 | Silverman et al. | |
| 3,902,585 A | 9/1975 | Mogtader | |
| 3,910,527 A | 10/1975 | Buhler et al. | |
| 3,982,160 A | 9/1976 | Goldschmidt et al. | |
| 3,984,809 A | 10/1976 | Dertouzos et al. | |
| 4,000,804 A | 1/1977 | Zaltieri | |
| 4,012,674 A | 3/1977 | Spitsbergen et al. | |
| 4,015,799 A | 4/1977 | Koski et al. | |
| 4,025,830 A | 5/1977 | Delaporte | |
| 4,079,828 A | 3/1978 | Babler | |
| 4,091,913 A | 5/1978 | Ku et al. | |
| 4,092,568 A * | 5/1978 | Newell | 318/35 |
| 4,093,149 A | 6/1978 | Shroff et al. | |
| 4,094,478 A | 6/1978 | Shroff et al. | |
| 4,095,758 A | 6/1978 | Shroff | |
| 4,096,417 A | 6/1978 | Chambolle | |
| 4,156,257 A | 5/1979 | Roberts | |
| 4,161,001 A | 7/1979 | Sakamoto | |
| 4,177,731 A | 12/1979 | Kleist et al. | |
| RE30,448 E | 12/1980 | Shroff | |
| 4,266,479 A | 5/1981 | Mahoney | |
| 4,286,888 A | 9/1981 | Bennett et al. | |
| 4,294,552 A * | 10/1981 | Mako | 400/219.1 |
| 4,313,376 A | 2/1982 | Swope et al. | |
| 4,313,683 A | 2/1982 | Brown et al. | |
| 4,354,211 A | 10/1982 | Gilovich et al. | |
| 4,366,371 A | 12/1982 | d'Alayer de Costemore d'Arc et al. | |
| 4,375,339 A | 3/1983 | Dyer | |
| 4,390,909 A * | 6/1983 | Sakamoto | 360/71 |
| 4,448,368 A | 5/1984 | Skalko | |
| 4,479,081 A | 10/1984 | Harris | |
| 4,531,166 A * | 7/1985 | Anderson | 360/73.04 |
| 4,573,645 A | 3/1986 | Harris, Jr. | |
| 4,577,198 A | 3/1986 | Hibino et al. | |
| 4,589,603 A | 5/1986 | Muller | |
| 4,632,582 A | 12/1986 | Houston | |
| 4,639,880 A | 1/1987 | Yasuhiro | |
| 4,642,655 A | 2/1987 | Sparer et al. | |
| 4,650,350 A | 3/1987 | Dorner | |
| 4,664,336 A | 5/1987 | Koyama | |
| 4,690,554 A * | 9/1987 | Froelich | 356/71 |
| 4,696,439 A | 9/1987 | Sukigara et al. | |
| 4,712,113 A | 12/1987 | Brooks et al. | |
| 4,752,842 A | 6/1988 | Odagiri | |
| 4,760,405 A | 7/1988 | Nagira et al. | |
| 4,786,992 A | 11/1988 | Tajima et al. | |
| 4,788,558 A | 11/1988 | Caldwell et al. | |
| 4,895,466 A | 1/1990 | Hartman et al. | |
| 4,897,668 A | 1/1990 | Nagato et al. | |
| 4,909,648 A | 3/1990 | Hartman et al. | |
| 4,924,240 A | 5/1990 | Herbert et al. | |
| 4,952,085 A | 8/1990 | Rein | |
| 4,953,044 A | 8/1990 | Van Pelt et al. | |
| 4,977,466 A | 12/1990 | Nakata | |
| 5,012,989 A | 5/1991 | Whyte, Jr. et al. | |
| 5,017,943 A | 5/1991 | Ogita et al. | |
| 5,080,296 A | 1/1992 | Raggio et al. | |
| 5,121,136 A | 6/1992 | Kawakubo | |
| 5,125,592 A | 6/1992 | Sato | |
| 5,160,943 A | 11/1992 | Pettigrew et al. | |
| 5,162,815 A | 11/1992 | Hodge | |
| 5,218,490 A | 6/1993 | Sakamoto et al. | |
| 5,259,563 A | 11/1993 | Kakiwaki et al. | |
| 5,281,038 A | 1/1994 | Schofield et al. | |
| 5,295,753 A | 3/1994 | Godo et al. | |
| 5,297,879 A | 3/1994 | Oikawa | |
| 5,300,953 A | 4/1994 | Schulte | |
| 5,313,343 A | 5/1994 | Yatomi | |
| 5,357,270 A | 10/1994 | Herbert | |
| 5,366,303 A | 11/1994 | Barrus et al. | |
| 5,372,439 A | 12/1994 | Poole et al. | |
| 5,415,482 A | 5/1995 | Poole et al. | |
| 5,477,400 A * | 12/1995 | Kawamata | 360/73.09 |
| 5,490,638 A | 2/1996 | Driftmyer et al. | |
| 5,505,550 A | 4/1996 | Kitahara et al. | |
| 5,529,410 A * | 6/1996 | Hunter et al. | 400/234 |
| 5,576,751 A | 11/1996 | Wada et al. | |
| 5,604,652 A | 2/1997 | Nishida et al. | |
| 5,609,425 A | 3/1997 | Kawano et al. | |
| 5,639,040 A | 6/1997 | Honjo | |
| 5,647,679 A | 7/1997 | Green et al. | |
| 5,649,672 A | 7/1997 | Wolff et al. | |
| 5,649,774 A | 7/1997 | Harding et al. | |
| 5,700,096 A | 12/1997 | Satoh et al. | |
| 5,701,214 A | 12/1997 | Inoue et al. | |
| 5,720,442 A | 2/1998 | Yanagihara et al. | |
| 5,731,672 A * | 3/1998 | Miyaguchi | 318/293 |
| 5,788,384 A | 8/1998 | Goodwin et al. | |
| 5,795,084 A | 8/1998 | Stone et al. | |
| 5,803,624 A | 9/1998 | Miazga et al. | |
| 5,816,719 A | 10/1998 | Palmer | |
| 5,820,280 A | 10/1998 | Fox | |
| 5,906,444 A | 5/1999 | Jorgensen | |
| 5,918,990 A | 7/1999 | Abumehdi | |
| 5,971,634 A | 10/1999 | Buckby et al. | |
| 5,993,092 A * | 11/1999 | Palmer | 400/234 |
| 6,000,868 A | 12/1999 | Watanabe et al. | |
| 6,036,382 A | 3/2000 | Middleton | |
| 6,046,756 A | 4/2000 | Iga et al. | |
| 6,082,914 A | 7/2000 | Barrus et al. | |
| 6,089,768 A | 7/2000 | Barrus et al. | |
| 6,128,152 A | 10/2000 | Mace | |
| 6,142,686 A | 11/2000 | Schanke et al. | |
| 6,164,203 A | 12/2000 | Keller | |
| 6,212,035 B1 * | 4/2001 | Maule | 360/128 |
| 6,261,012 B1 | 7/2001 | Haas et al. | |
| 6,305,628 B1 | 10/2001 | Thompson et al. | |
| 6,305,629 B1 | 10/2001 | Chliwnyj et al. | |
| 6,307,583 B1 | 10/2001 | Randolph et al. | |
| 6,315,471 B1 * | 11/2001 | Hsieh et al. | 400/234 |
| 6,669,136 B2 | 12/2003 | Niioka et al. | |
| 6,754,026 B1 | 6/2004 | Koski | |
| 6,840,689 B2 | 1/2005 | Barrus et al. | |
| 6,969,064 B2 | 11/2005 | Ichikawa et al. | |
| 2003/0049065 A1 | 3/2003 | Barrus et al. | |
| 2004/0041047 A1 | 3/2004 | Karp et al. | |

FOREIGN PATENT DOCUMENTS

| | | |
|---|---|---|
| EP | 0157096 | 10/1985 |
| EP | 0176009 | 4/1986 |
| EP | 0294633 | 12/1988 |
| EP | 0 329 478 A2 | 8/1989 |
| EP | 0481579 A2 | 10/1991 |
| EP | 0481579 | 4/1992 |
| EP | 0532238 | 3/1993 |
| EP | 537392 A1 * | 4/1993 |
| EP | 0556066 | 8/1993 |
| EP | 0582285 | 2/1994 |
| EP | 0 589 715 | 3/1994 |
| EP | 0 683 055 A2 | 11/1995 |
| EP | 0 734 876 A2 | 10/1996 |
| EP | 0 741 044 A2 | 11/1996 |
| EP | 0 765 221 | 4/1997 |
| EP | 0 804 343 B1 | 11/1997 |
| EP | 0 830 252 B1 | 3/1998 |
| EP | 0 842 785 A1 | 5/1998 |

| | | |
|---|---|---|
| EP | 0840311 | 5/1998 |
| EP | 0854480 | 7/1998 |
| EP | 0 861 735 A1 | 9/1998 |
| EP | 0936078 | 2/1999 |
| EP | 0945273 | 9/1999 |
| EP | 0955178 | 11/1999 |
| EP | 1000756 | 5/2000 |
| EP | 1 409 388 | 4/2004 |
| EP | 1470926 | 10/2004 |
| FR | 2783459 | 3/2000 |
| FR | 2783459 A1 * | 3/2000 |
| FR | 9811893 | 3/2000 |
| GB | 1 361 288 | 7/1974 |
| GB | 1 576 750 | 10/1980 |
| GB | 2077970 | 12/1981 |
| GB | 2087104 | 5/1982 |
| GB | 2 163 915 | 3/1986 |
| GB | 2 175 253 | 11/1986 |
| GB | 2201013 | 8/1988 |
| GB | 2 272 669 | 5/1994 |
| GB | 2289441 | 11/1995 |
| GB | 2 298 821 | 9/1996 |
| GB | 2 302 523 | 1/1997 |
| GB | 2 306 916 | 5/1997 |
| GB | 2 310 405 | 8/1997 |
| GB | 2 315 244 | 1/1998 |
| GB | 2343655 | 5/2000 |
| GB | 2 349 605 | 11/2000 |
| GB | 2354974 | 4/2001 |
| GB | 2 369 326 | 5/2002 |
| GB | 2 369 602 | 6/2002 |
| GB | 2400582 | 10/2004 |
| GB | 2400818 | 10/2004 |
| GB | 2404896 | 2/2005 |
| JP | 59-17125 | 1/1984 |
| JP | 59004559 A * | 1/1984 |
| JP | 60-157891 | 8/1985 |
| JP | S60-157891 | 8/1985 |
| JP | 60-211653 | 10/1985 |
| JP | 61-169265 | 7/1986 |
| JP | 63-104875 | 5/1988 |
| JP | 63-122045 | 5/1988 |
| JP | 63-317963 | 12/1988 |
| JP | 01271984 A * | 10/1989 |
| JP | 1-300455 | 12/1989 |
| JP | 4-274044 | 9/1992 |
| JP | 4-305486 | 10/1992 |
| JP | 05058014 | 3/1993 |
| JP | 05058014 A * | 3/1993 |
| JP | H5-58014 | 3/1993 |
| JP | H6-134275 | 6/1994 |
| JP | 08002078 | 1/1996 |
| JP | 08002078 A * | 1/1996 |
| JP | 08244324 | 9/1996 |
| JP | H8-244324 | 9/1996 |
| JP | 9-151011 | 6/1997 |
| JP | 10175357 A * | 6/1998 |
| JP | 10-181972 | 7/1998 |
| JP | 2000116101 A * | 4/2000 |
| JP | 2000-229456 | 8/2000 |
| JP | 2004-181691 | 7/2004 |
| WO | WO 92/09517 | 6/1992 |
| WO | WO93/01055 | 1/1993 |
| WO | WO 95/34896 | 12/1995 |
| WO | WO96/14990 | 5/1996 |
| WO | WO 96/28304 | 9/1996 |
| WO | WO 96/32258 | 10/1996 |
| WO | WO97/35727 | 10/1997 |
| WO | WO97/35728 | 10/1997 |
| WO | WO 97/36751 | 10/1997 |
| WO | WO 99/34983 | 7/1999 |
| WO | WO99/46129 | 9/1999 |
| WO | WO 02/22371 | 3/2002 |
| WO | WO03011728 | 2/2003 |
| WO | WO 03/029013 | 4/2003 |

OTHER PUBLICATIONS

Machine translation of JP 08002078 A.*
*Markem v. Zipher*, UK High Court And Court of Appeals Record. (See Attachment A for listing of Record).
GB 0121652.2 (Combined Search and Examination Report, Mar. 27, 2002).
GB 0121652.2 (Applicants Response to Combined Search and Examination Report, Sep. 26, 2002).
Chinese Application No. 01818632.7 First Office Action with English Translation (Dec. 31, 2004).
University Physics, 9th Edition—Young Freedman, p. 308.
Datamax DMX 5000 ATB Printer, Maintenance Manual, Documentation P/N:88-0080-01, Revision B, Datamax Corporation, 1987, 1993.
*Markem Corporation v. Zipher, Ltd. et al.*, Order, Jan. 12, 2010, pp. 1-5, Doc. 125, Case No. 07-cv-06-PB.
Burke et al, Switchable Stepper Motor Control, IBM Technical Disclosure Bulletin, Nov. 1989, pp. 430-431, vol. 32, No. 63.
Barnett, J.A., Use of Stepper Motor as Variable Load, IBM Technical Disclosure Bulletin, Apr. 1977, pp. 4120-4121, vol. 19, No. 11.
*Markem Corporation v. Zipher, Ltd. et al.*, Order, Sep. 1, 2009, pp. 1-2, Doc. 117, Case No. 07-cv-06-PB.
Laidman, Russell, Stepper Motors and Control Part II—Bipolar Stepper Motor and Control, stepperworld.com, Jun. 1999, pp. 1-5.

* cited by examiner

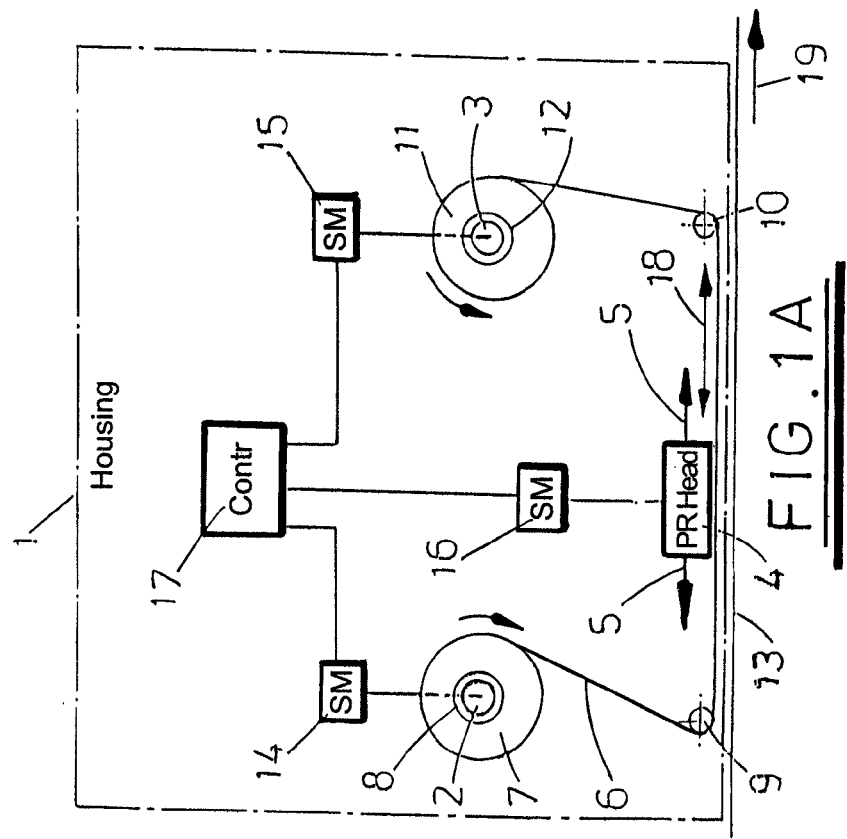
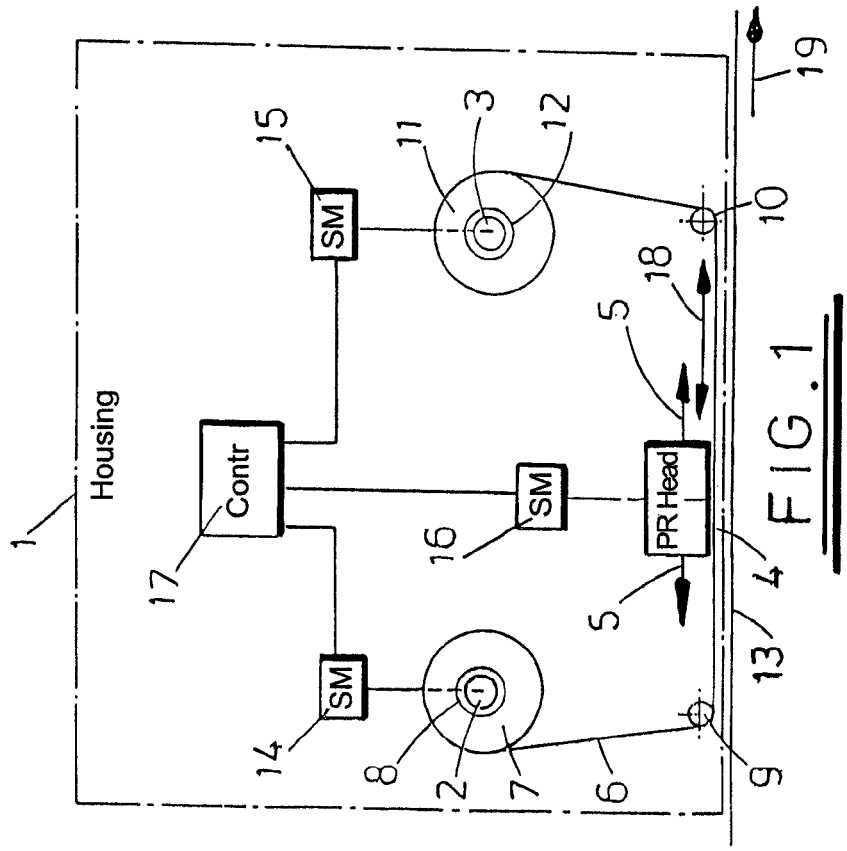

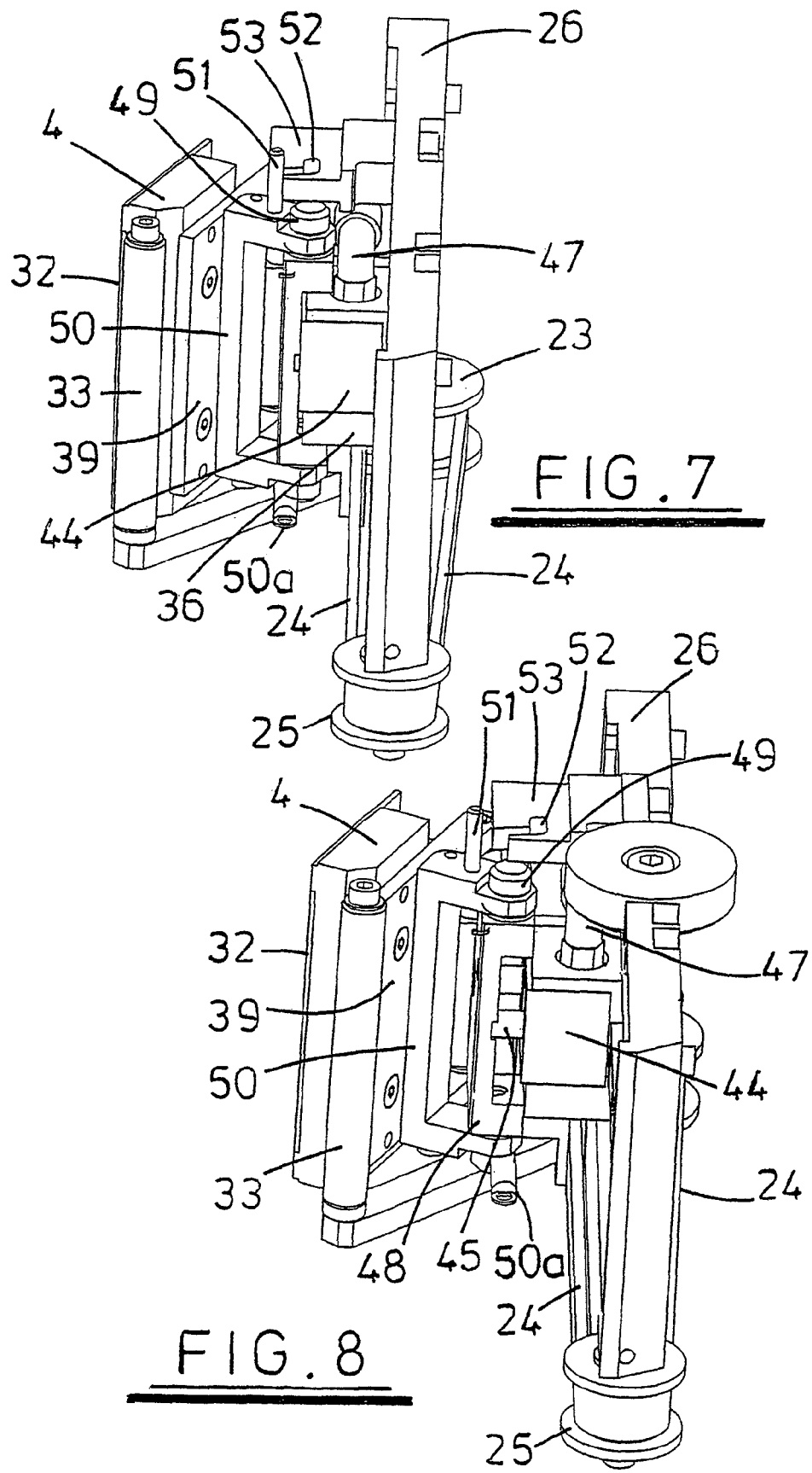

TAPE DRIVE AND PRINTING APPARATUS

RELATED APPLICATIONS

This application is a continuation of U.S. application Ser. No. 11/533,957 filed Sep. 21, 2006, which is a continuation of U.S. application Ser. No. 10/380,182, filed Mar. 16, 2004, now U.S. Pat. No. 7,150,572 which is a US national phase of international application PCT/GB01/03965 which designated the U.S. and was filed Sep. 5, 2001, and claims benefit of GB 0022206.7 dated Sep. 11, 2000; GB 0028465.3 dated Nov. 22, 2000; GB 0100493.6 dated Jan. 9, 2001, and GB 0111044.4 dated May 2, 2001, the entire contents of all of these applications are hereby incorporated by reference.

BACKGROUND

1. Technical Field

This invention generally relates to tape drive and printing apparatus and to methods of operation for same and to apparatus and methods which may be used in transfer printers, that is printers which make use of carrier-supported inks.

2. Related Art

In transfer printers, a tape which is normally referred to as a printer ribbon and carries ink on one side is presented within a printer such that a print head can contact the other side of the ribbon to cause the ink to be transferred from the ribbon onto a target substrate of for example paper or a flexible film. Such printers are used in many applications. Industrial printing applications include thermal transfer label printers and thermal transfer coders which print directly onto a substrate such as packaging materials manufactured from flexible film or card.

Ink ribbon is normally delivered to the end user in the form of a roll wound onto a core. The end user pushes the core onto a tape spool, pulls a free end of the roll to release a length of ribbon, and then engages the end of the tape with a further spool. Generally the spools are mounted on a cassette which can be readily mounted on a printing machine. The printing machine includes a transport means for driving the two spools, so as to unwind ribbon from one spool and to take up ribbon on the other spool. The printing apparatus transports ribbon between the two spools along a predetermined path past the printing head.

Known printers of the above type rely upon a wide range of different approaches to the problem of how to drive the ribbon spools. Some rely upon stepper motors, others on DC motors to directly or indirectly drive the spools. Generally the known arrangements drive only the spool onto which ribbon is taken up (the take-up spool) and rely upon some form of "slipping clutch" arrangement on the spool from which ribbon is drawn (the supply spool) to provide a resistive force so as to ensure that the ribbon is maintained in tension during the printing and ribbon winding processes and to prevent ribbon overrun when the ribbon is brought to rest. It will be appreciated that maintaining adequate tension is an essential requirement for proper functioning of the printer.

As a roll of ribbon is gradually used by the printer, the initial outside diameter of the supply spool decreases and the initial outer diameter of the take-up spool increases. In slipping clutch arrangements which offer an essentially constant resistive torque, the ribbon tension will vary in proportion to the diameter of the spools. Given that it is desirable to use large supply spools so as to minimize the number of times that a ribbon roll has to be replenished, this is a serious problem particularly in high speed machines where rapid ribbon transport is essential.

Dynamically changing ribbon tension gives rise to demands for tight tolerances for the torque delivered by the slipping clutch. Such tolerances are difficult to maintain as wear in the slipping clutch over time tends to change the resistive force exerted by the clutch. If the clutch force is too great the ribbon transport system may have inadequate power to drive the ribbon throughout the range of spool diameters from a new supply roll to an empty supply roll. Too little clutch force and slack in the ribbon could result in overrun of the supply spool. Given these constraints, typical printer designs have compromised performance by way of limiting the rate of acceleration, the rate of deceleration, and the maximum speed capability of the ribbon transport system. Overall printer performance has as a result been compromised.

Representative examples of conventional printing apparatus are described in U.S. Pat. No. 4,000,804, U.S. Pat. No. 4,294,552, U.S. Pat. No. 4,479,081, U.S. Pat. No. 4,788,558 and British patent 2310405.

The system of U.S. Pat. No. 4,000,804 describes an arrangement for transferring a ribbon from a supply spool to a take-up spool which includes a pair of electric motors each one of which is connected to a corresponding spool shaft. The motors are direct current (DC) motors. The motor connected to the take-up spool is supplied by a constant current generator so as to wind up the ribbon with a substantially constant torque. The motor connected to the supply spool is supplied by a constant voltage generator so as to keep the ribbon tensioned during ribbon transfer. A change-over device alternates the function of the two spools when the ribbon is fully wound on the take-up spool. With the described arrangement, no account is taken of the change in diameters of the supply and take-up spools during ribbon transfer and thus ribbon tension varies substantially during the course of the full transfer of the ribbon from the supply spool to the take-up spool.

U.S. Pat. No. 4,294,552 discloses a bi-directional ribbon drive in which two spools are driven by respective stepper motors. The take-up spool is driven by its stepper motor, but the supply spool motor is fed a low level "drag" current to maintain the ribbon in tension. The motors are not actively controlled to compensate for spool diameter variations.

U.S. Pat. No. 4,479,081 describes an arrangement in which two stepper motors are provided, one driving the take-up spool and the other coupled to the supply spool. Feedback signals provide an indication of the angular velocity of the supply spool and a function table provides information on the rate of stepping pulses to be applied to the take-up spool. The ribbon is driven by the stepper motor driving the take-up spool, the other motor acting as a feedback transducer to enable appropriate control of the motor driving the take-up spool to take account of changing spool diameters while maintaining a constant ribbon speed. Thus although this arrangement does avoid the need for example of a capstan drive interposed between the two spools so as to achieve reliable ribbon delivery speeds, only one of the motors is driven to deliver torque to assist ribbon transport. There is no suggestion that the apparatus can operate in push-pull mode, that is the motor driving the take-up spool operating to pull the ribbon and the motor driving the supply spool operating to push the associated spool in a direction which assists tape transport.

U.S. Pat. No. 4,788,558 describes a ribbon drive mechanism in which two DC motors are provided, one driving the take-up spool and one driving the supply spool. Ribbon is delivered by a further drive roller driven by a stepper motor. The supply spool DC motor acts as a brake and does not assist in tape transport. Thus this is a conventional arrangement in which a capstan roller is used to control ribbon delivery speed. With such an arrangement it is a relatively simple matter as described to provide feedback information concerning the magnitude of the ribbon spools so as to maintain a desired ribbon tension, but the overall system is complex.

GB 2310405 describes a bi-directional printer ribbon drive mechanism in which a stepper motor drives a take-up spool. Accurate control of ribbon delivery is achieved by providing an idler roller which rotates in contact with the ribbon and thus enables a direct measurement of ribbon transport speed. The provision of such an idler roller and associated components adds to overall system complexities and cost.

None of the known arrangements is capable of coping well with the requirements of high speed industrial transfer printing systems. Such systems generally operate in one of two manners, that is either continuous printing or intermittent printing. In both modes of operation, the apparatus performs a regularly repeated series of printing cycles, each cycle including a printing phase during which ink is being transferred to a substrate, and a further non-printing phase during which the apparatus is prepared for the printing phase of the next cycle.

In continuous printing, during the printing phase a stationary print head is brought into contact with a printer ribbon the other side of which is in contact with a substrate onto which an image is to be printed. (The term "stationary" is used in the context of continuous printing to indicate that although the print head will be moved into and out of contact with the ribbon, it will not move relative to the ribbon path in the direction in which ribbon is advanced along that path). Both the substrate and printer ribbon are transported past the print head, generally but not necessarily at the same speed. Generally only relatively small lengths of the substrate which is transported past the printer head are to be printed upon and therefore to avoid gross wastage of ribbon it is necessary to reverse the direction of travel of the ribbon between printing operations. Thus in a typical printing process in which the substrate is traveling at a constant velocity, the print head is extended into contact with the ribbon only when the print head is adjacent regions of the substrate to be printed. Immediately before extension of the print head, the ribbon must be accelerated up to for example the speed of travel of the substrate. The ribbon speed must then be maintained at the constant speed of the substrate during the printing phase and, after the printing phase has been completed, the ribbon must be decelerated and then driven in the reverse direction so that the used region of the ribbon is on the upstream side of the print head. As the next region of the substrate to be printed approaches, the ribbon must then be accelerated back up to the normal printing speed and the ribbon must be positioned so that an unused portion of the ribbon close to the previously used region of the ribbon is located between the print head and the substrate when the print head is advanced to the printing position. Thus very rapid acceleration and deceleration of the ribbon in both directions is required, and the ribbon drive system must be capable of accurately locating the ribbon so as to avoid a printing operation being conducted when a previously used portion of the ribbon is interposed between the print head and the substrate.

In intermittent printing, a substrate is advanced past a print head in a stepwise manner such that during the printing phase of each cycle the substrate and generally but not necessarily the ribbon are stationary. Relative movement between the substrate, ribbon and print head are achieved by displacing the print head relative to the substrate and ribbon. Between the printing phase of successive cycles, the substrate is advanced so as to present the next region to be printed beneath the print head and the ribbon is advanced so that an unused section of ribbon is located between the print head and the substrate. Once again rapid and accurate transport of the ribbon is necessary to ensure that unused ribbon is always located between the substrate and print head at a time that the print head is advanced to conduct a printing operation.

The requirements in terms of ribbon acceleration, deceleration, speed and positional accuracy of high speed transfer printers is such that the known drive mechanisms have difficulty delivering acceptable performance with a high degree of reliability. Similar constraints also apply in applications other than high speed printers. Accordingly it is an object of the present exemplary embodiment to provide a tape drive which can be used to deliver printer ribbon in a manner which is capable of meeting the requirements of high speed production lines, although the tape drive of the present invention may of course be used in other applications where similar high performance requirements are demanded.

BRIEF DESCRIPTION

In an exemplary embodiment, there is provided a tape drive comprising two motors at least one of which is a stepper motor, two tape spool supports on which spools of tape may be mounted, each spool support being drivable by a respective motor, and a controller for controlling the energization of the motors such that tape may be transported in at least one direction between spools mounted on the spool supports, wherein the controller is operative to energize both motors to drive the spools of tape in the direction of tape transport.

A tape drive in accordance with an exemplary embodiment relies upon both the motors which drive the two tape spools to drive the tape during tape transport. Thus the two motors operate in push-pull mode. This makes it possible to achieve very high rates of acceleration and deceleration. Tension in the tape being transported is determined by control of the drive motors and therefore is not dependent upon any components which have to contact the tape between the take-up and supply spools. Thus a very simple overall mechanical assembly can be achieved. Given that both motors contribute to tape transport, relatively small and therefore inexpensive and compact motors can be used.

The actual rotational direction of each spool will depend on the sense in which the tape is wound on each spool. If both spools are wound in the same sense then both spools will rotate in the same rotational direction to transport the tape. If the spools are wound in the opposite sense to one another, then the spools will rotate in opposite rotational directions to transport the tape. In any configuration, both spools rotate in the direction of tape transport.

Preferably the controller is arranged to control the motors to transport tape in both directions between the spools. The motors may both be stepper motors and the controller may be operative to monitor tension in a tape being transported between spools mounted on the spool support and to control the motors to maintain the monitored tension between predetermined limits. Means are preferably provided to monitor the power supply to at least one of the motors and to calculate an estimate of tape tension from the monitored power. For example, where two stepper motors are provided, a power supply may deliver power to a stepper motor drive means which supplies current sequentially to windings of the stepper motors, the power being monitored by means for monitoring the magnitude of voltage and/or current supplied to the motors and/or the motor drive means. It will be appreciated that dependent upon the load applied to the motors the current and voltage delivered to the motor windings will both vary, irrespective of the type and nature of the motor drive means used. For this reason it is preferred to provide a regulated power supply which supplies a substantially constant voltage to the stepper motor drive means and to monitor the magnitude of current supplied to the stepper motor drive means from the power supply.

Preferably each stepper motor is energized by a respective motor drive circuit, a respective low resistance resistor being connected in series with each motor drive circuit, and voltage signals developed across the series resistors being monitored to monitor the current supplied to the motors. The voltage signals may be converted to digital signals for supply to a microcontroller which controls the generation of motor control pulse trains which are applied to the motor drive circuits. The current may be monitored over a predetermined period of time and preferably is monitored only during periods in which tape transport speed is substantially constant. The predetermined period of time may correspond to a predetermined length of tape transport.

Calibration data may be recorded for the or each stepper motor, the calibration data representing power consumption for the stepper motor at each of a series of step rates under no tape load conditions, and a measure of tape tension may be calculated by reference to a measure of motor step rate, the calibration data related to the step rate, and the power consumed by the motor.

The outside diameters of the tape spool may be directly monitored and the tape tension calculated to take into account the monitored diameters. The outside diameters may be monitored for each of a plurality of diameters which are mutually inclined to each other so as to enable the detection of spool eccentricity and therefore enable an accurate calculation of the spool circumference.

A measure of tension t may be calculated from measures of power supplied to the two motors, measures of the spool radii, calibration factors for the two motors related to the step rate of the motors. A calibration scaling factor may also be used to translate the calculated tension into a more interpretable value. Preferably the controller implements a control algorithm to calculate a length of tape to be added to or subtracted from the tape extending between the spools in order to maintain the value t between predetermined limits and to control the stepper motors to add or subtract the calculated length of tape to the tape extending between the spools. Alternatively, a measure of the difference between the current supplied to the two motors may be derived and stepping of the motors may be controlled dependent upon the difference measure. It will be appreciated that the difference measure could simply be the result of subtracting one current from the other or could relate to the ratio of the two measured currents. Motor speed may be maintained constant during a period in which the difference measure is within each of a series of tolerance bands defined between upper and lower limits, and the tolerance bands may be adjusted in dependence upon the ratio of the outside diameters of the spools. The controlling means may implement a control algorithm to calculate a length of tape to be added to or subtracted from the tape extending between the spools in order to maintain the difference measure between the upper and lower limit and to control the stepper motors to add or subtract the calculated length of tape to the tape extending between the spools.

A value corresponding to tape width may be input and the predetermined limit adjusted to take account of that tape width. For example, the control algorithm may comprise gain constants, and the gain constants may be adjusted to take account of tape width. The control algorithm may operate cyclically such that during one cycle the length of tape to be added or subtracted is calculated and during a subsequent cycle the motors are controlled to adjust the amount of tape between the spools. This approach is adopted because, as it will be appreciated that although the length of tape between the spools is to a first approximation independent of tension, stretching of the tape will mean that if tape is added to the length of tape extending between the spools this will be taken up by a reduction in stretch until the tension becomes zero. It will be further appreciated that for a given tension, a narrower tape will stretch more than a wider tape, therefore a change in tension, caused by the addition or subtraction of tape between the spools, will be less for a narrower tape than for a wider tape.

Tension monitoring makes it possible to generate a fault-indicating output if the measure of tension falls below a minimum acceptable limit to indicate for example a tape breakage.

Spool diameters may be monitored using an optical sensing system including at least one light emitter and at least one light detector arranged such that an optical path is established there between, a transport mechanism supporting at least one part of the optical sensing system and drivable so as to cause the optical path to sweep across a space within which spools to be measured will be located, and a controller operative to control the transport mechanism, to detect positions of the transport mechanism in which the output of the detector changes to indicate a transition between two conditions in one of which the optical path is obstructed by a spool and in the other of which the optical path is not obstructed by that spool, and to calculate the spool diameters from the detected positions of the transport mechanism in which the detector output changes.

One of the emitter and detector may be mounted on the transport mechanism, the other being fixed in position relative to the spools of tape, or alternatively both the emitter and detector may be mounted on the transport mechanism, the optical path between the emitter and detector being established by a mirror located at the side of the spools remote from the transport mechanism and arranged to reflect light from the emitter back to the detector. Spool diameters may be measured with the spools in a first position, the spools may then be rotated so that one spool rotates by for example 30°, the diameters may be measured again, and so on. This makes it possible to accurately assess spool eccentricity and outer circumference.

An exemplary embodiment has particular applicability where the transport mechanism is a print head transport mechanism of a transfer ribbon printer. The ratio of spools in such a machine can be calculated on the basis of the output of the diameter measuring means. The ratio calculating means may comprise means enabling a first stepper motor driving a take-up spool and disabling a second stepper motor driving a supply spool such that the second stepper motor acts as a generator, means for generating pulses from the second stepper motor, the pulse rate being proportional to motor speed, means for detecting the generated pulses to produce a measure of the rotation of the second stepper motor, means for monitoring stepping of the first stepper motor to produce a measure of the rotation of the first stepper motor, and means for comparing the measures of the rotations of the motors to calculate the ratio of the outside diameters of the spools.

After a number of operating cycles of the tape drive, in which tape is transported between the spools, an updated diameter for at least one of the spools may be calculated from a ratio between the spool diameters as initially monitored, a current ratio between the spool diameters, and the diameter of at least one spool as initially monitored.

Where the tape drive in accordance with an exemplary embodiment is incorporated in a transfer printer for transferring ink from a printer ribbon to a substrate which is transported along a predetermined path adjacent to the printer, the tape drive acting as a printer ribbon drive mechanism for transporting ribbon between first and second ribbon spools, the printer may further comprise a print head arranged to contact one side of the ribbon to press an opposite side of the ribbon into contact with a substrate on the predetermined path, a print head drive mechanism for transporting the print head along a track extending generally parallel to the predetermined substrate transport path and for displacing the print head into and out of contact with the ribbon, and a controller controlling the printer ribbon and print head drive mechanisms, the controller being selectively programmable either to cause the ribbon to be transported relative to the predetermined substrate transport path with the print head stationary and displaced into contact with the ribbon during printing, or to cause the print head to be transported relative to the ribbon and the predetermined substrate transport path and to be displaced into contact with the ribbon during printing.

The drive mechanism may be bidirectional such that ribbon may be transported from the first spool to the second spool and from the second spool to the first.

Where the print head is mounted on a print head carriage that is displaceable along the track, first and second carriages may be provided which are interchangeable and shaped such that with one carriage in position on the track the print head is disposed so as to enable printing on a substrate traveling in one direction along the substrate transport path and with the other carriage in position on the track the print head is disposed so as to enable printing on a substrate traveling in the other direction along the substrate path.

The tape drive may be incorporated in a printing apparatus comprising a housing, a print head mounted on a print head support assembly which is displaceable relative to the housing in a direction parallel to a print ribbon path along which a ribbon is driven by the tape drive, a first drive mechanism for displacing the print head support relative to the housing, a roller which in use supports a substrate to be printed on the side of the ribbon path remote from the print head, a second drive mechanism for displacing the print head relative to the print head support assembly to a printing position in which a portion of the print head bears against the roller or any substrate or ribbon interposed between the print head and roller, and a controller for adjusting the first drive mechanism to adjust the angular position of the print head relative to the rotation axis of the roller.

Preferably the print head is mounted on a print head support assembly which is displaceable relative to the housing in a direction parallel to a print ribbon path along which a ribbon is driven by the tape drive, a first drive mechanism for displacing the print head support relative to the housing, a peel off roller mounted on the print head support assembly and displaceable with the print head in the said parallel direction, and a second drive mechanism for displacing the print head relative to the print head support assembly and peel off roller between a ready to print position adjacent the print ribbon path and a printing position in which the print head would contact a print ribbon on the path, wherein a cam mechanism is provided which is engaged as a result of displacement of the print head support assembly to a predetermined position and when engaged causes retraction of the print head away from the ready to print position to a position spaced from the peel-off roller and the print ribbon path.

The cam mechanism may comprise a plate mounted in the housing and defining a slot, and a pin extending from a pivotal member mounted on the print head support assembly, engagement of the pin in the slot as a result of displacement of the print head support assembly to the predetermined position causing the pivotal member to rotate from a first position in which it supports the print head to a second position in which the print head is free to move to the position spaced from the peel-off roller and the print ribbon path.

The pivotal member may be mounted on a displaceable member mounted on the print head support assembly, displacement of the displaceable member from a retracted to an extended position when the pivotal member is in the first position causing the print head to move from the ready to print position from the printing position.

The printing apparatus may further comprise means for applying the print head to a ribbon supported in the drive mechanism, the print head comprising an array of printing elements each of which may be selectively energized to release ink from a portion of ribbon contacted by that element, and a controller for controlling energization of the printing elements and the advance of the ribbon so as to perform a series of printing cycles each of which includes a printing phase during which relative movement between the print head and ribbon results in the print head traversing a predetermined length of ribbon and a non-printing phase during which the ribbon is advanced a predetermined distance relative to the print head, wherein the controller is arranged selectively to energize different groups of printing elements during successive printing cycles, the groups of elements being distributed on the print head such that different groups contact different portions of the ribbon, and the controller is arranged to advance the ribbon such that the said predetermined distance of ribbon advance is less than the said predetermined length of ribbon, the groups of printing elements being energized such that that ribbon is advanced by at least said predetermined length of ribbon in the interval between any two printing phases in which the same group of printing elements are energized. Two groups of printing elements may be provided such that the distance of ribbon advance may be as little as half the predetermined length of ribbon.

Given the fundamental differences between continuous and intermittent printing systems as described above, it has been industry practice to provide printing apparatus which is capable either of use in a continuous printing application or for use in an intermittent printing application but not to provide a printer with the versatility to perform both functions. The fundamental difference between the two types of printing apparatus required for these two applications is that in one (continuous printing) the print head is stationary (using that term in the manner discussed above) whereas in the other (intermittent) the printing head must be displaceable. As a result, when a particular production line is converted from for example an intermittent printing application to a continuous printing application it is necessary to replace all of the printing equipment. This represents a considerable cost to users of such equipment.

It is an object of an exemplary embodiment to obviate or mitigate the problems outlined above.

According to a second aspect of an exemplary embodiment, there is provided a transfer printer for transferring ink from a printer ribbon to a substrate which is transported along a predetermined path adjacent the printer, comprising a printer ribbon drive mechanism for transporting ribbon between first and second ribbon spools, a print head arranged to contact one side of the ribbon to press an opposite side of the ribbon into contact with a substrate on the predetermined path, a print head drive mechanism for transporting the print head along a track extending generally parallel to the predetermined substrate transport path and for displacing the print head into and out of contact with the ribbon, and a controller controlling the printer ribbon and print head drive mechanisms, the controller being selectively programmable either to cause the ribbon to be transported relative to the predetermined substrate transport path with the print head stationary and displaced into contact with the ribbon during printing, or to cause the print head to be transported relative to the ribbon and the predetermined substrate transport path and to be displaced into contact with the ribbon during printing.

Thus the second aspect of this exemplary embodiment provides a printing apparatus with sufficient versatility to be able to be used in both continuous and intermittent applications.

The transfer printer of the second aspect of the exemplary embodiment as defined above may be used in conjunction with any or all of the features of the first aspect of the exemplary embodiment as discussed above. In particular, the drive mechanism may be bidirectional, the drive mechanism may comprise two stepper motors each driving a respective one of the first and second ribbon spools in the direction of tape transport, ribbon tension may be monitored and the stepper motors controlled to maintain the monitored tension within predetermined limits, the print head drive mechanism may comprise a further stepper motor coupled to the print head, and the print head may be mounted on a carriage that is displaceable along a track. In addition, first and second carriages which are interchangeable may be provided to enable printing on a substrate traveling in either direction along the substrate transport path and a peel off roller mounted adjacent the print head may be reversible in position relative to the print head.

As outlined above, in tape drives which are used to transfer tape such as a printer ribbon between two spools, the diameters of the spools change during the course of tape transfer from one spool to the other. This dramatically affects the relative speeds of the two spools which must be maintained if the tape is to remain in tension. Various attempts have been made to account for this effect, and notably the approach adopted in U.S. Pat. No. 4,479,081. None of the known approaches however is satisfactory in delivering a reliable accurate measurement of spool diameters to thereby enable an accurate and appropriate control of drive motor speeds in an arrangement in which the two motors are operating in push-pull mode. Whereas some of the known systems can cope with tape drives in which the initial conditions are always the same (for example a fresh supply spool of known outside diameter is connected to an empty take-up spool), in many applications it is quite often the case that an operator will fit to a machine a tape which has been partially used such that the supply spool which initially was of known outside diameter has partly been transferred to the take-up spool.

It is an object of an exemplary embodiment to obviate or mitigate the problems outlined above.

According to a third aspect of an exemplary embodiment, there is provided an apparatus for measuring the diameters of two spools of tape mounted on a tape drive mechanism which is drivable to transport tape between the spools, comprising an optical sensing system including at least one light emitter and at least one light detector arranged such that an optical path is established there between, a transport mechanism supporting at least part of the optical sensing system and drivable so as to cause the optical path to sweep across a space within which spools to be measured will be located, and a controller operative to control the transport mechanism, to detect positions of the transport mechanism in which the output of the detector changes to indicate a transition between two conditions in one of which the optical path is obstructed by a spool and in the other of which the optical path is not obstructed by that spool, and to calculate the spool diameters from the detected positions of the transport mechanism in which the detector output changes.

This third aspect of an exemplary embodiment makes it possible to accurately determine spool sizes. In an apparatus such as a transfer printer with a displaceable print head the displaceable component can be readily mounted on the displaceable print head so as to require no additional electromechanical components over and above those necessary for the normal functioning of the apparatus.

The apparatus of the third aspect of the exemplary embodiment as defined above may be used in conjunction with any of the features of the first and second aspects of the exemplary embodiment as defined above.

Print heads used in for example transfer printers must be accurately positioned relative to a platen which supports a substrate to be printed if good quality print is to be produced, particularly at high printing speeds. An angular displacement of only a few degrees can radically affect print quality. The traditional approach to dealing with this problem is to position a print head on an appropriate support assembly in a nominally correct position, to then run a test print to see what quality results, and to then mechanically adjust the position of the print head so as to optimize print quality. This involves an installer making very small mechanical adjustments using for example spacers. This can be a time consuming process.

It is an object of an exemplary embodiment to obviate or mitigate the problems outlined immediately above.

According to a fourth aspect of an exemplary embodiment, there is provided a printing apparatus comprising a housing, a print head mounted on a print head support assembly which is displaceable relative to the housing in a direction parallel to a print ribbon path, a first drive mechanism for displacing the print head support relative to the housing, a roller which in use supports a substrate to be printed on the side of the ribbon path remote from the print head, a second drive mechanism for displacing the print head relative to the print head support assembly to a printing position in which a portion of the print head bears against the roller or any substrate or ribbon interposed between the print head and roller, and a controller for adjusting the first drive mechanism to adjust the angular position of the print head relative to the rotation axis of the roller.

Preferably, the portion of the print head that bears against the roller or any substrate or ribbon interposed between the print head and roller, is the portion of the print head that contains selectively energizeable printing elements. The elements may be linearly arranged along the portion of the print head, for example the linear array of elements may be arranged along an edge, or parallel in close proximity to an edge of the print head.

In operation, an installer could initially position a print head so that it would assume a nominal position which would be expected to produce good quality print. A test print run would then be used to assess print quality, the print head support would then be displaced relative to the housing, and a fresh print run would be conducted, the process being repeated until the resultant print quality was optimized. There is thus no requirement for the installer to make small mechanical adjustments to the position of the print head on its support.

The printing apparatus in accordance with the fourth aspect of the exemplary embodiment may be used in conjunction with any of the features of the first, second and third aspects of the exemplary embodiment as defined above.

In many tape drive mechanisms and particularly in ribbon printing machines, loading a fresh print ribbon can be a difficult process as the print ribbon has to be correctly positioned along a non-linear path. Often replacement print ribbons are mounted in a cassette which is designed to be readily mounted in a predetermined orientation on an associated printing apparatus. In such arrangement it is generally necessary to position a length of ribbon extending between support on the cassette between a print head and a peel off roller. This is difficult to achieve unless the print head and peel off roller can be moved apart to provide a wide enough track into which the ribbon can be inserted.

It is known to provide an arrangement in which either the print head or the peel off roller can be displaced by a lever mechanism which is actuated when a cassette is mounted on a printing apparatus. For example if the cassette is held in position by a mechanical latch, release of the latch will move the print head and peel off roller apart whereas engagement of the latch moves them together to a ready-to-print position.

Such arrangements are satisfactory in terms of performance but disadvantageous as valuable space is occupied by the lever mechanisms, thereby reducing the space available for taking large diameter spools of tape.

It is an object of an exemplary embodiment to obviate or mitigate the problems outlined above.

According to a fifth aspect of an exemplary embodiment, there is provided a printing apparatus comprising a housing, a print head mounted on a print head support assembly which is displaceable relative to the housing in a direction parallel to a print ribbon path, a first drive mechanism for displacing the print head support relative to the housing, a peel off roller mounted on the print head support assembly and displaceable with the print head in the said parallel direction, and a second drive mechanism for displacing the print head relative to the print head support assembly and peel off roller between a ready to print position adjacent the print ribbon path and a printing position in which the print head would contact a print ribbon on the path, wherein a cam mechanism is provided which is engaged as a result of displacement of the print head support assembly to a predetermined position and when engaged causes retraction of the print head away from the ready to print position to a position spaced from the peel-off roller and the print ribbon path.

In an arrangement in accordance with the fifth aspect of an exemplary embodiment, when a cassette carrying a print ribbon is to be replaced, an electronic signal can be generated to cause transport of the print support assembly to a predetermined position (a "docked" position). This automatically retracts the print head away from the peel-off roller, enabling the easy insertion of a tape between the print head and peel-off roller.

The printing apparatus according to the fifth aspect of the exemplary embodiment may be used in conjunction with any of the features of the first, second, third and fourth aspects of the exemplary embodiment as defined above.

Another problem encountered with printing machines is that of achieving sufficient tape transport speeds in the interval between printing phases of successive printing cycles. In some instances the time taken to transport a printing ribbon by a distance equal to the length of ribbon traversed by the printing head during one printing cycle is a limiting factor in overall machine speed. It would be advantageous to be able to reduce the distance that a ribbon is advanced between any two successive printing cycles.

According to a sixth aspect of an exemplary embodiment, there is provided a printing apparatus comprising a print head, a printing ribbon drive mechanism for advancing a printing ribbon between the print head and a path along which in use a substrate to be printed is advanced, means for applying the print head to a ribbon supported in the drive mechanism, the print head comprising an array of printing elements each of which may be selectively energized to release ink from a portion of ribbon contacted by that element, and a controller for controlling energization of the printing elements and the advance of the ribbon so as to perform a series of printing cycles each of which includes a printing phase during which relative movement between the print head and ribbon results in the print head reversing a predetermined length of ribbon and a non-printing phase during which the ribbon is advanced a predetermined distance relative to the print head, herein the controller is arranged selectively to energize different groups of printing elements during successive printing cycles, the groups of elements being distributed on the print head such that different groups contact different portions of the ribbon, and the controller is arranged to advance the ribbon such that the said predetermined distance of ribbon advance is less than the said predetermined length of ribbon, the groups of printing elements being energized such that the ribbon is advanced by at least said predetermined length of ribbon in the interval between any two printing phases in which the same group of printing elements are energized.

If the printing elements are arranged in two groups, for example alternate pixels distributed across a linear printing head, an image may be printed in one printing cycle using one group, the ribbon may be advanced by half the length of ribbon traversed by the printer during the first cycle, a second image may be printed using the other group during a second cycle, the ribbon may again be advanced by half the traverse distance of the printing head, and then the first group may be energized during a third printing cycle and so on. Thus the maximum tape travel between successive printing cycles can be half that which must be accommodated in conventional printing systems.

The printing apparatus according to the sixth aspect of the exemplary embodiment may be used in conjunction with any of the features of the first, second, third, fourth and fifth aspects of the exemplary embodiment as defined above.

It will of course be appreciated that if the printing elements were divided into three groups, tape advance between successive cycles could be limited to one third of the length of ribbon traversed by the print head in one cycle.

BRIEF DESCRIPTION OF THE DRAWINGS

An exemplary embodiment will now be described, by way of example, with reference to the accompanying drawings, in which:

FIG. 1 is a schematic illustration of a printer ribbon drive system in accordance with the exemplary embodiment;

FIG. 1a is an illustration of a modification to the drive system of FIG. 1;

FIGS. 4 to 9 are further illustrations of the drive assembly of FIG. 2;

DETAILED DESCRIPTION

Figure 2:
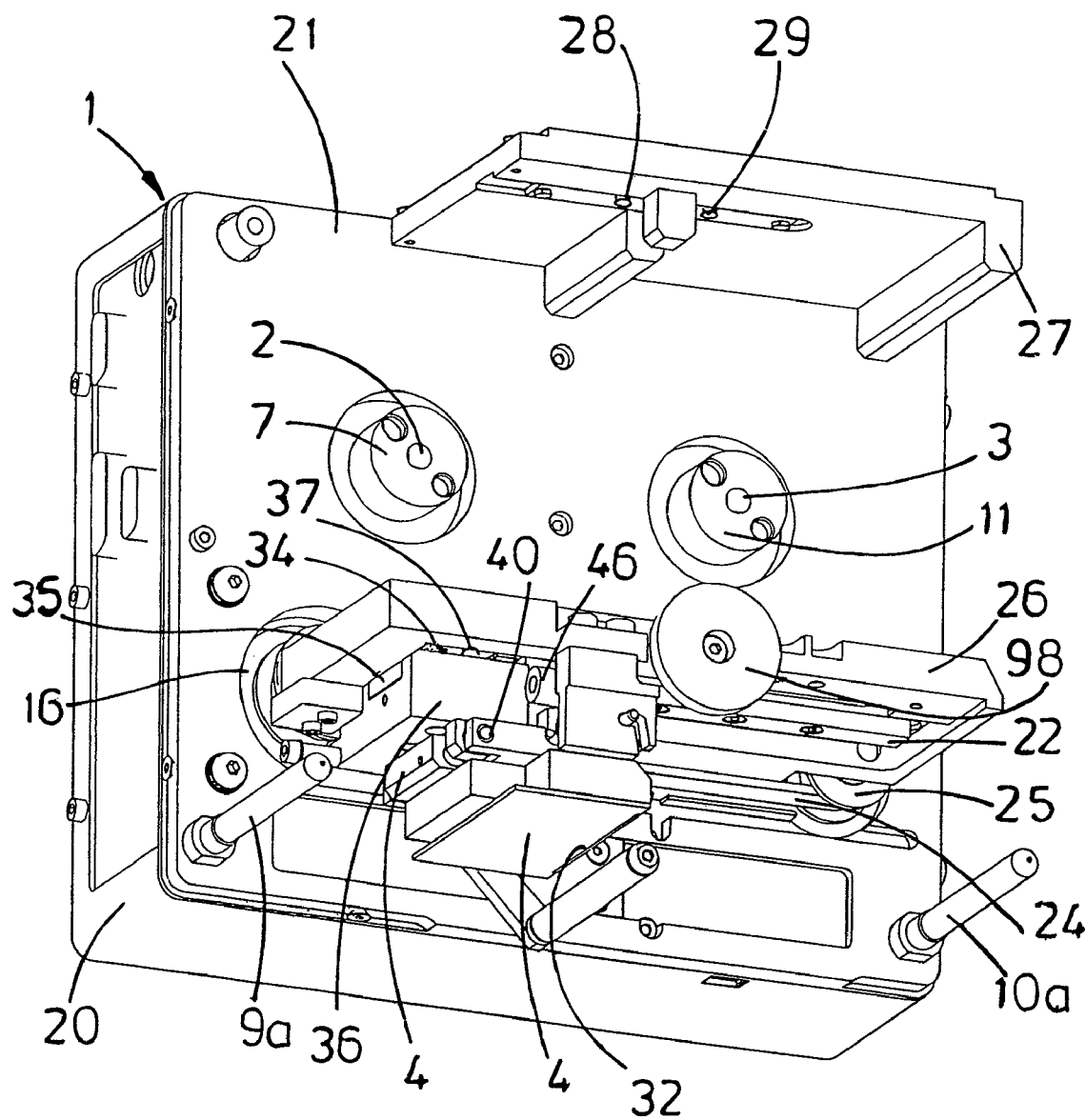
FIG. 2 is a perspective view of a printer drive assembly of a ribbon drive system as described with reference to FIG. 1.

Referring to FIG. 1, the schematically illustrated printer in accordance with an exemplary embodiment has a housing represented by broken line 1 supporting a first shaft 2 and a second shaft 3. A displaceable print head 4 (PR Head) is also mounted on the housing, the print head being displaceable along a linear track as indicated by arrows 5. A printer ribbon 6 extends from a spool 7 received on a mandrel 8 which is driven by the shaft 2 around rollers 9 and 10 to a second spool 11 supported on a mandrel 12 which is driven by the shaft 3. The path followed by the ribbon 6 between the rollers 9 and 10 passes in front of the print head 4. A substrate 13 upon which print is to be deposited follows a parallel path to the ribbon 6 between rollers 9 and 10, the ribbon 6 being interposed between the print head 4 and the substrate 13.

The shaft 2 is driven by a stepper motor 14 (SM) and the shaft 3 is driven by a stepper motor 15 (SM). A further stepper motor 16 (SM) controls the position on its linear track of the print head 4. A controller 17 (Contr) controls each of the three stepper motors 14, 15 and 16 as described in greater detail below, the stepper motors being capable of driving the print ribbon 6 in both directions as indicated by arrow 18.

In the configuration illustrated in FIG. 1, the spools 7 and 11 are wound in the same sense as one another and thus rotate in the same rotational direction to transport the tape. FIG. 1a illustrates a modification of the drive system of FIG. 1 in which the spools are wound in the opposite sense to one another and must rotate in opposite directions to transport the tape. Thus the first spool 7 rotates clockwise while the second spool 11 rotates anticlockwise to transport the printer ribbon 6 from the first spool 7 to the second spool 11.

As described in greater detail below, the printer schematically illustrated in FIG. 1 can be used for both continuous and intermittent printing applications. In continuous applications, the substrate 13 will be moving continuously. During a printing cycle, the print head will be stationary but the ribbon will move so as to present fresh ribbon to the print head as the cycle progresses. In contrast, in intermittent applications, the substrate is stationary during each printing cycle, the necessary relative movement between the substrate and the print head being achieved by moving the print head during the printing cycle. The ribbon generally will be stationary during the printing cycle. In both applications, it is necessary to be able to rapidly advance and return the ribbon 6 between printing cycles so as to present fresh ribbon to the print head and to minimize ribbon wastage. Given the speed at which printing machines operate, and that fresh ribbon should be present between the print head and substrate during any printing cycle, it is necessary to be able to accelerate the ribbon 6 in both directions at a high rate and to accurately position the ribbon relative to the print head. In the arrangement shown in FIG. 1 it is assumed that the substrate 13 will move only to the right as indicated by arrow 19 but as described below the apparatus can be readily adapted to print on a substrate traveling to the left in FIG. 1.

Figure 3:
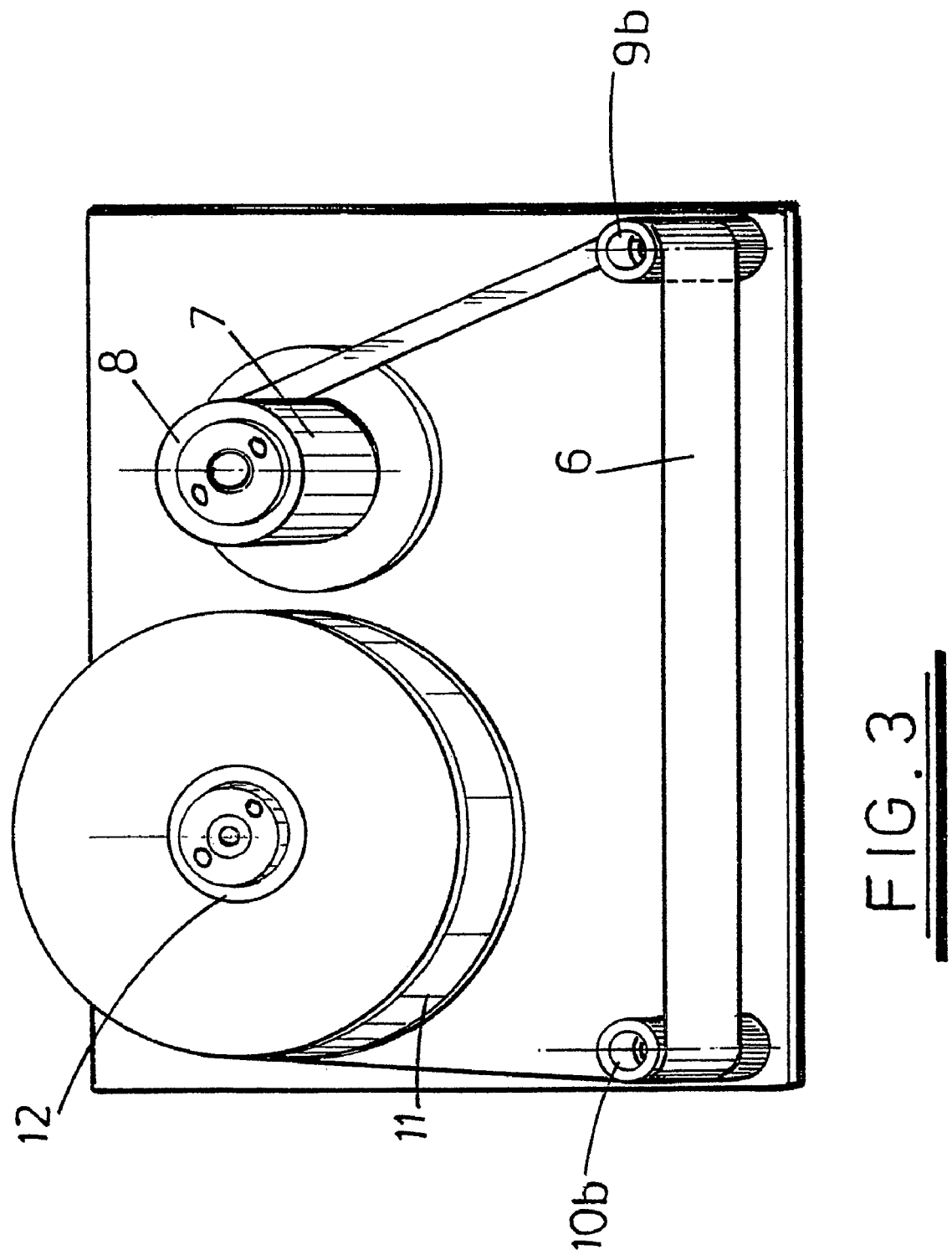
FIG. 3 is a schematic perspective view of a printer ribbon cassette which may be mounted on the assembly of FIG. 2.
Figure 4:
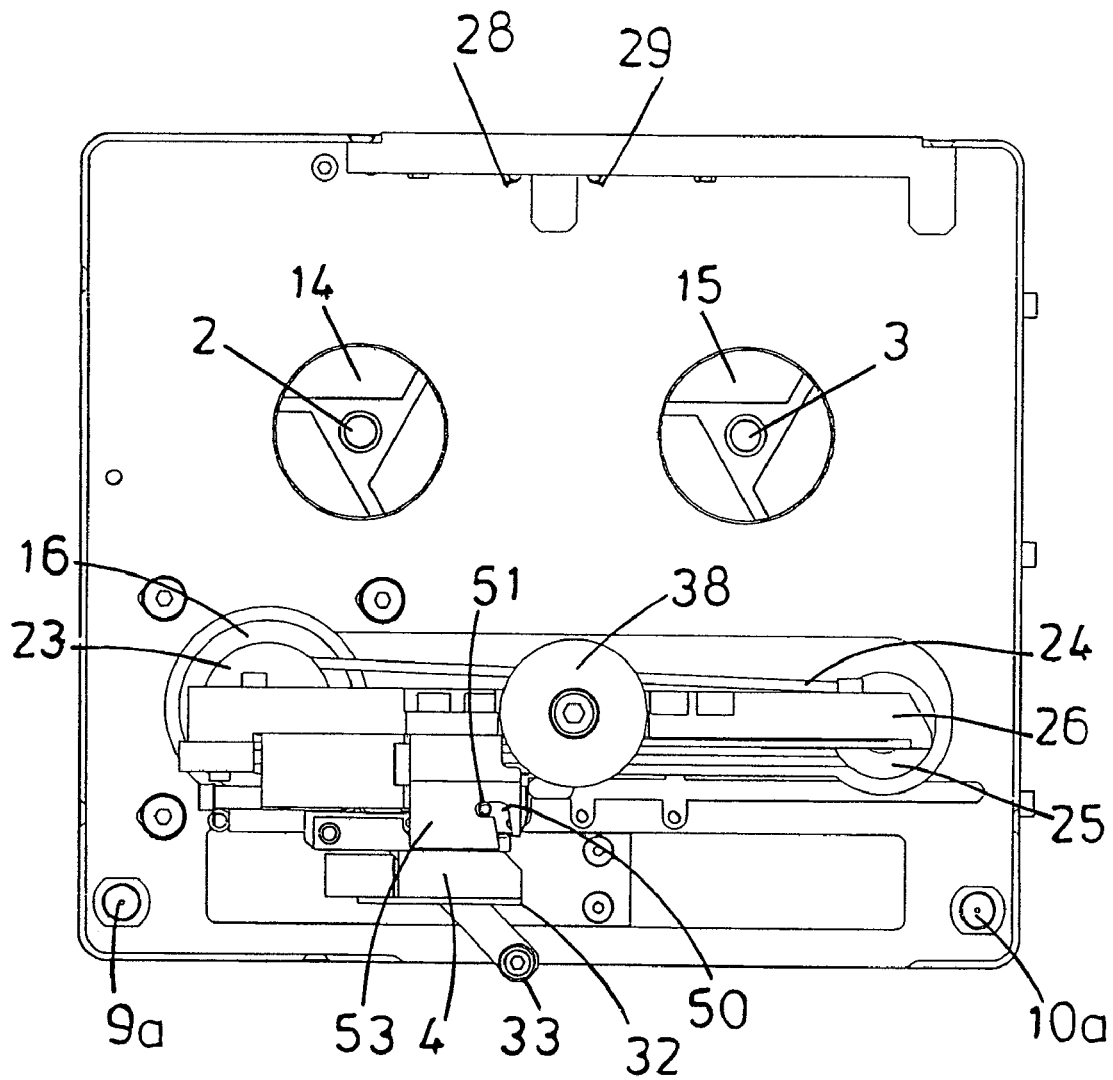

Referring to FIGS. 2, 3 and 4, electromechanical components making up the printer shown in outline with reference to the schematic illustration of FIG. 1 will now be described. The printer housing 1 comprises a casing 20 in which various electronic components to be described below are housed behind a cover plate 21. The shafts 2 and 3 project through apertures in the cover plate 21, guide pins 9a and 10a project from the cover plate 21, and the print head 4 is mounted above the cover plate 21. The print head 4 is part of an assembly which is displaceable along a linear track 22 which is fixed in position relative to the cover plate 21. The stepper motor 16 which controls the position of the print head assembly is located behind the cover plate 21 but drives a pulley wheel 23 that in turn drives a belt 24 extending around a further pulley wheel 25, the belt being secured to the print head assembly. Thus rotation of the pulley wheel 23 in the clockwise direction in FIG. 4 drives the print head assembly to the left in FIG. 4 whereas rotation of the pulley wheel 23 in the anti-clockwise direction in FIG. 4 drives the print head assembly to the right in FIG. 4. The pulley wheels 23 and 25 and the linear track 22 are mounted on a rigid bracket 26 which extends upwardly from the cover plate 21. FIG. 2 shows drive discs mounted on the shafts 2 and 3, the drive discs defining diametrically spaced sockets intended to engage ribbon spools 7 and 11, whereas in FIG. 4 the drive discs have been removed to show the upper surfaces of the stepper motors 14 and 15.

Referring to FIG. 3, this illustrates a printer ribbon supported on a cassette which may be mounted on the printer of FIG. 2. Hollow roller supports 9b and 10b are intended to receive the pins 9a and 10a respectively shown in FIG. 2, such that the combination of pin 9a and hollow roller 9b together constitute the roller 9 of FIG. 1 and such that the pin 10a and hollow roller 10b together constitute the roller 10 of FIG. 1. The spools 7 and 11 are supported on the mandrels 8 and 12 which are a push fit on rotatable shafts mounted on a common cover plate with the hollow rollers 9b and 10b. The rotatable shafts define pins which engage with the sockets defined on the drive discs driven by the shafts 2, 3. Thus, with the cassette in place, the ribbon can be transferred between the two spools 7 and 11.

The housing cover plate 21 (FIG. 2) also supports an upstanding rear bracket 27 on which a pair of emitters 28, 29 are supported. These two emitters operate in cooperation with a receiver which is displaceable with the print head assembly as described in greater detail below.

Figure 5:
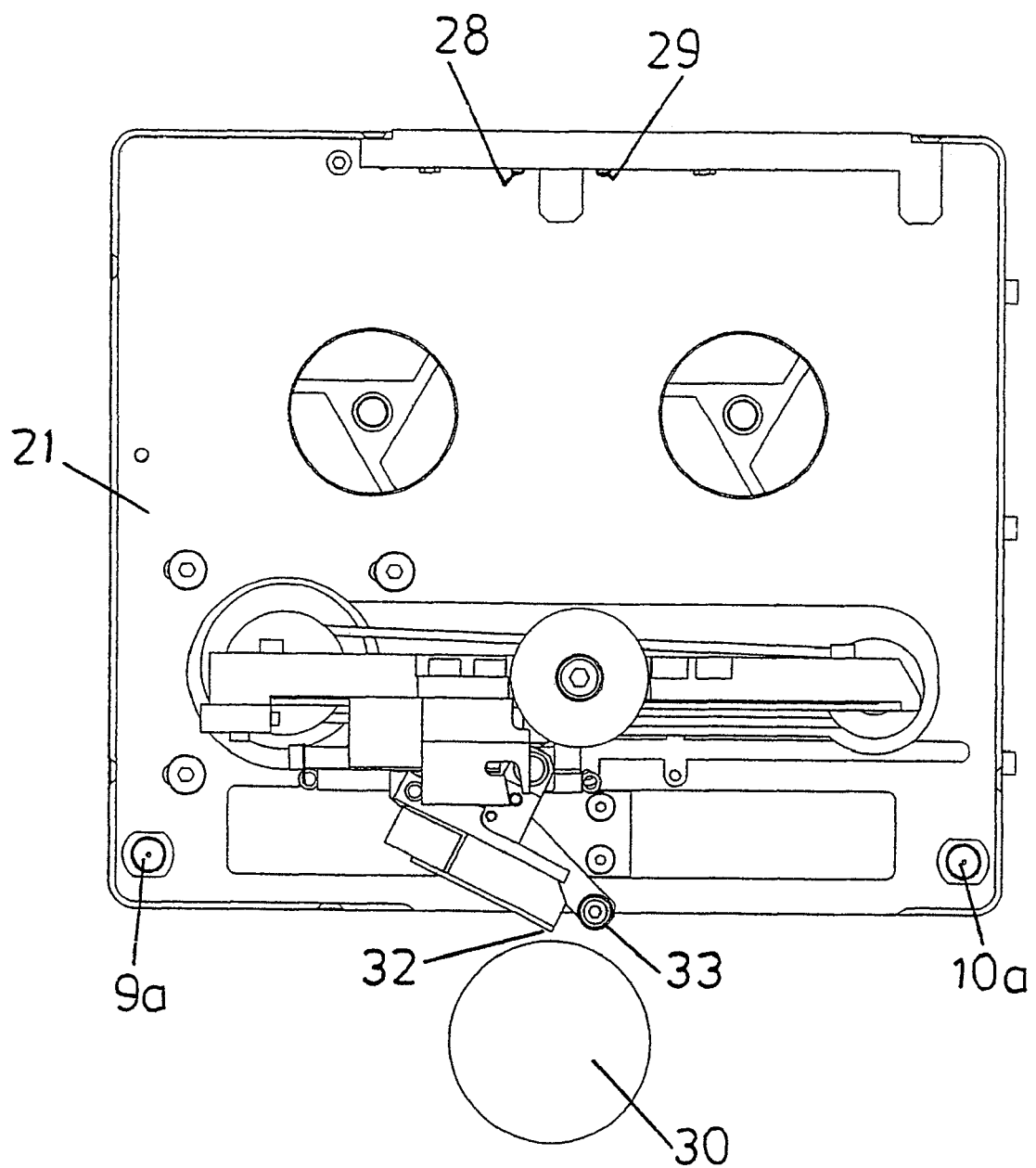
Figure 6:
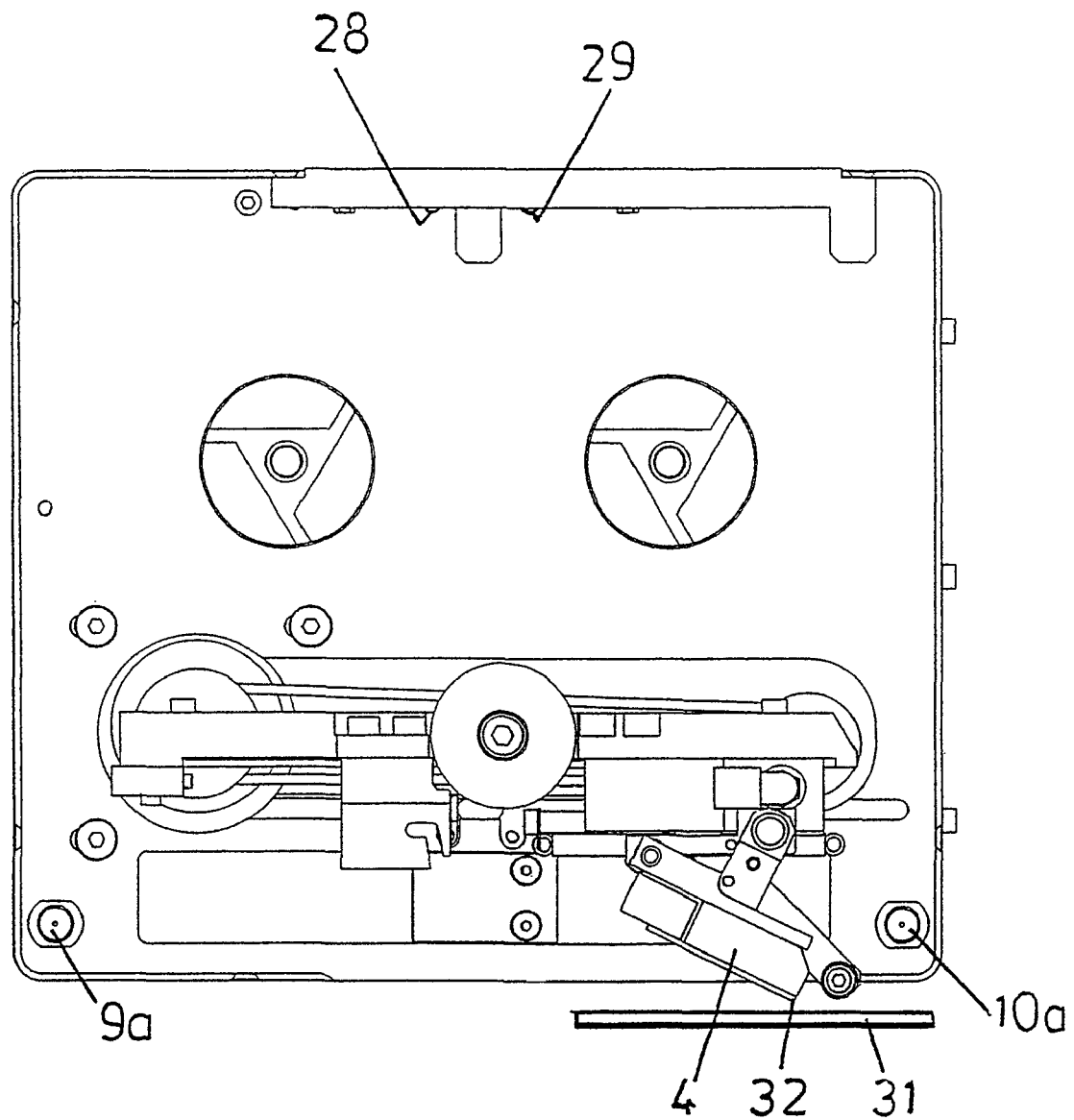

The print head assembly 4 is shown in a "docked" position in FIGS. 2 and 4 and in a position in FIG. 5 in which it is ready-to-print on a roller platen 30 (assuming operation in a continuous mode with a continuously moving substrate), and in a ready to print position in FIG. 6 in which the print head is ready to print on a substrate which is stationary and positioned in front of a stationary flat platen 31. In the position shown in FIGS. 2 and 4, an edge 32 of the print head 4 is retracted behind the ribbon path between rollers 9 and 10 whereas a peel-off roller 33 is positioned on the opposite side of the ribbon path from the print head 4. This makes it an easy matter to install a fresh cassette of ribbon. In contrast, in the ready-to-print positions shown in FIGS. 5 and 6, the print head 4 has been advanced so that the edge 32 projects just beyond the outer extremity of the roller 33. Thus in the ready-to-print position the print ribbon passes around the edge 32 and is deflected away from the underlying substrate by the peel-off roller 33.

The edge 32 of the print head 4 (which is of conventional form) supports an array of heating elements each of which is selectively energizeable. When the ribbon 6 is sandwiched between the head 4 and a substrate 13, ink adjacent any energized heating element is melted and transferred to the substrate. Thus by appropriate control of the heating elements, small portions of ink carried by the ribbon 6 can be transferred to the substrate 13. Each of these portions of ink can be considered as defining one pixel of the image to be printed.

Figure 9:
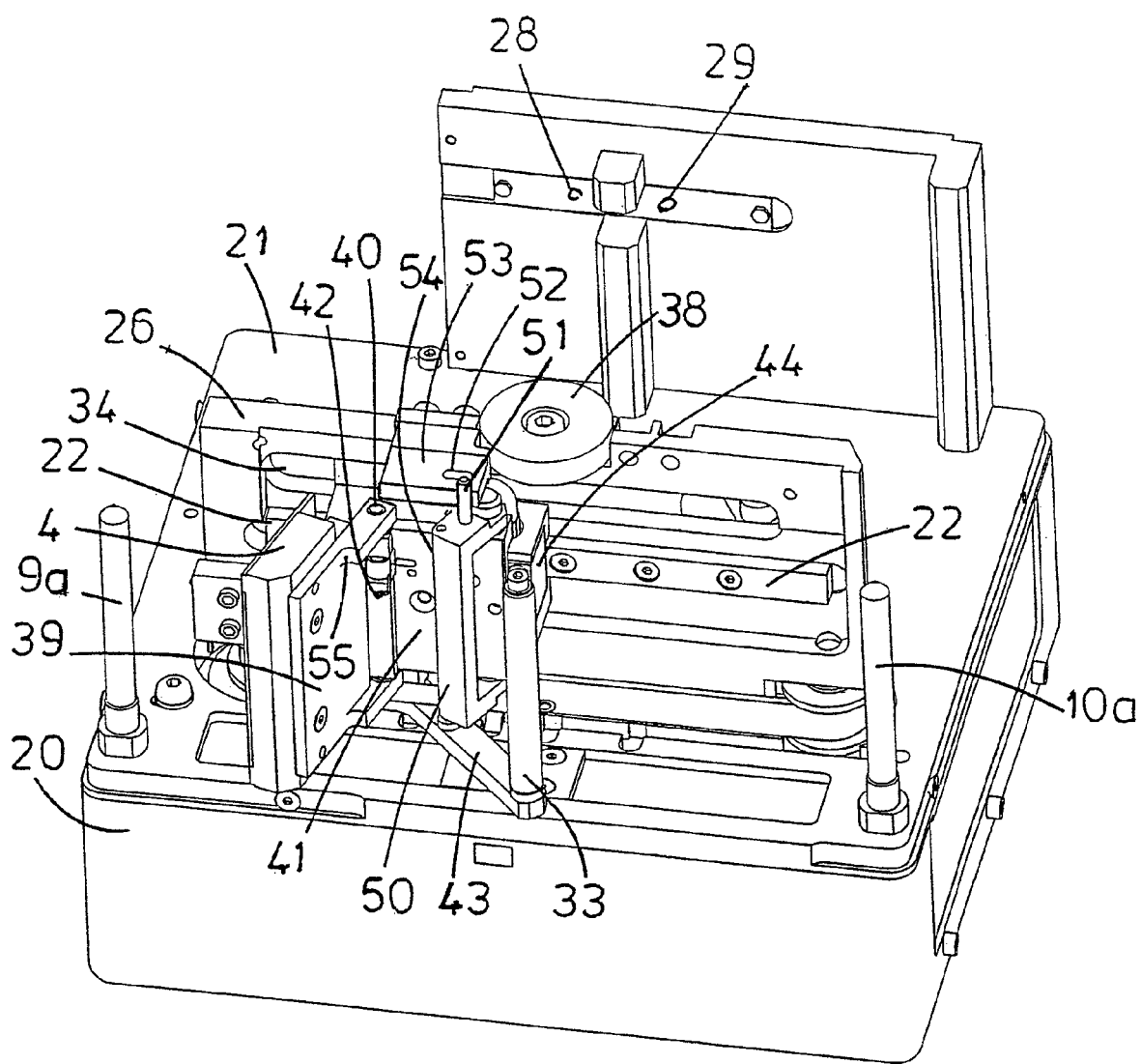

Referring now to all of FIGS. 2 to 9, the detailed structure of the print head assembly and the slider upon which it is mounted will be described. FIG. 9 shows the print head assembly pulled forward to an adjustment position revealing associated components of the assembly. FIG. 9 is the best view of a slot 34 formed in the upstanding bracket 26 on which the linear track 22 is mounted. A slider 35 supporting a print head carriage 36 is mounted on the linear track 22 (FIG. 2). The slider 35 and track 22 are high-accuracy products to provide smooth, low friction, parallel movement of the print head carriage 36 relative to the bracket 26. An optical detector 37 is mounted on the print head carriage 36 so as to be in register with the slot 34 formed in the bracket 26. The detector 37 is used as described below to detect light emitted from the emitters 28 and 29, the slot 34 ensuring that the only obstruction between the detector 37 and the emitters 28 and 29 will be any spools of ribbon mounted on the printer in a cassette such as that illustrated in FIG. 3. The cassette is secured against displacement relative to the components illustrated in FIG. 3 by a permanent magnet (not shown) incorporated in the cassette body and cooperating with a circular steel keeper 38 mounted on top of the bracket 26 (FIG. 4). Alternative arrangements for securing the cassette in position are of course possible, for example mechanical latch assemblies.

The print head carriage 36 supports the print head assembly which comprises the print head 4 which is bolted to a pivotal plate 39 that is mounted to pivot about pivot pin 40 that in turn is mounted on a plate 41 bolted to the print head carriage 36. A spring 42 biases the plate 39 towards the plate 41 so that in the absence of any obstruction the print head 4 will assume the position relative to the print head carriage 36 as shown in FIG. 4. The peel off roller 33 is fixed in position on an arm 43 which is bolted to the print head carriage 36.

A pneumatic drive unit 44 is a sliding fit within a slot provided in the print head carriage 36 and drives a piston 45 which is shown in the extended position in FIG. 8 and the retracted position in FIG. 7. The pneumatic drive 44 is connected to a flexible pneumatic supply line (not shown) connected to an air inlet 46 (FIG. 2). The inlet 46 is connected to a tube 47 which extends through an opening in the print head carriage 36 so as to communicate with the pneumatic drive unit 44. The pneumatic drive unit piston 45 bears against a U-shaped member 48 which is coupled by pivot pin 49 to a U-shaped bracket 50. The bracket 50 supports a pin 51 (FIG. 9) which is intended to engage in a slot 52 in a cam plate 53. The bracket 50 defines a curved corner 54 which is intended to engage against curved surface 55 defined in plate 39 as shown in FIGS. 7 and 8. If however the pin 51 is received in and pushed to the blind end of the slot 52, the bracket 50 is pushed away from the print head 4, enabling the plate 39 to swing towards the plate 41 so that the print head 4 assumes the docked position shown in FIGS. 2 and 4.

The bracket 50 is spring biased by a spring (not shown) coupled to a lever 50a (see FIG. 7) so as normally to assume the position shown in FIG. 7. If pressurized air is then supplied to the pneumatic drive 44, the assembly assumes the position shown in FIG. 8 in which it will be seen that the printing edge 32 of the print head 4 has been pushed well beyond the peel-off roller 33. If with the pneumatic drive unit 44 de-energized and therefore the U-shaped member 48 in the position shown in FIG. 7 the carriage is moved so that the pin 51 enters the slot 52, further movement of the carriage in the same direction will cause the pin 51 to move into the blind end of the slot, thereby causing the bracket 50 to turn about the pivot pin 49 so as no longer to obstruct movement of the print head 4 to the docked position. If movement of the carriage is then reversed, the pin 51 causes the bracket 50 to swing out again, pushing the print head 4 to the position shown in FIG. 7. The position shown in FIG. 7 corresponds to "ready to print" and the position shown in FIG. 8 corresponds to "printing".

Figure 10:
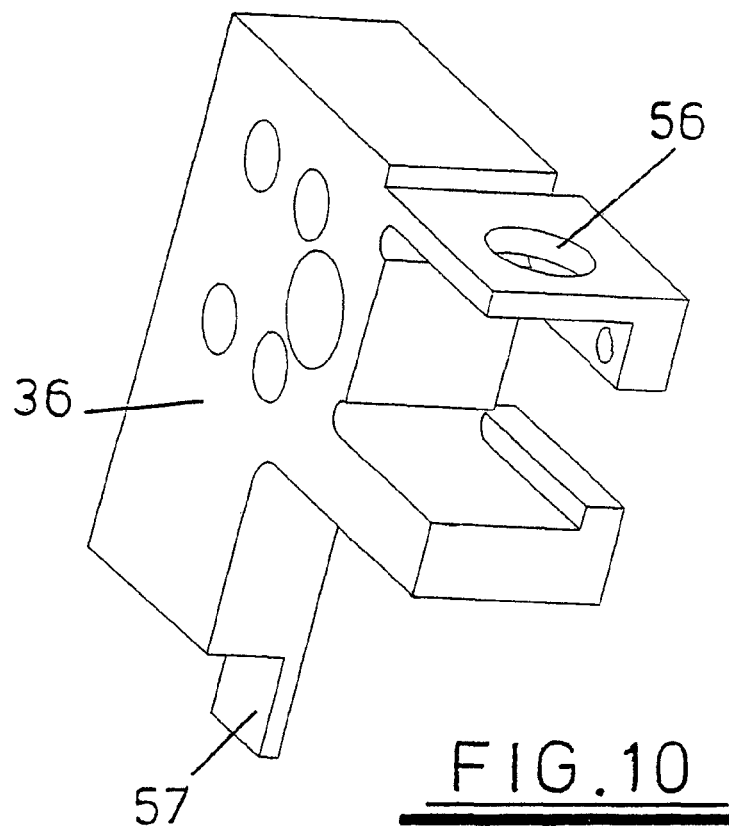
FIG. 10 is a perspective view of a print head support carriage incorporated in the drive assembly of FIG. 2.

FIG. 10 is a perspective view of the print head carriage 36 showing the socket which in the assembled apparatus receives the pneumatic drive unit 44. An opening 56 is provided to receive the air inlet tube 47 (see FIG. 7). A tongue 57 projects from the lower edge of the print head carriage 36 and is used in a manner not shown to attach the print head carriage to the belt 24.

Figure 11:
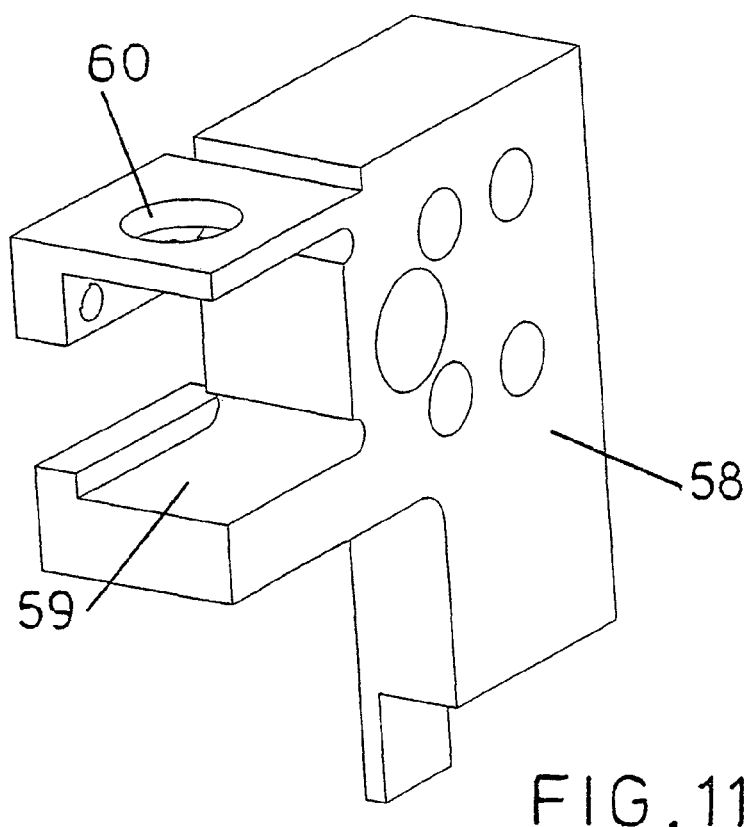
FIG. 11 is a perspective view of an alternative print head support carriage to that shown in FIG. 10 which may be used to reverse the positions of components of the drive assembly of FIG. 2.
Figure 12:
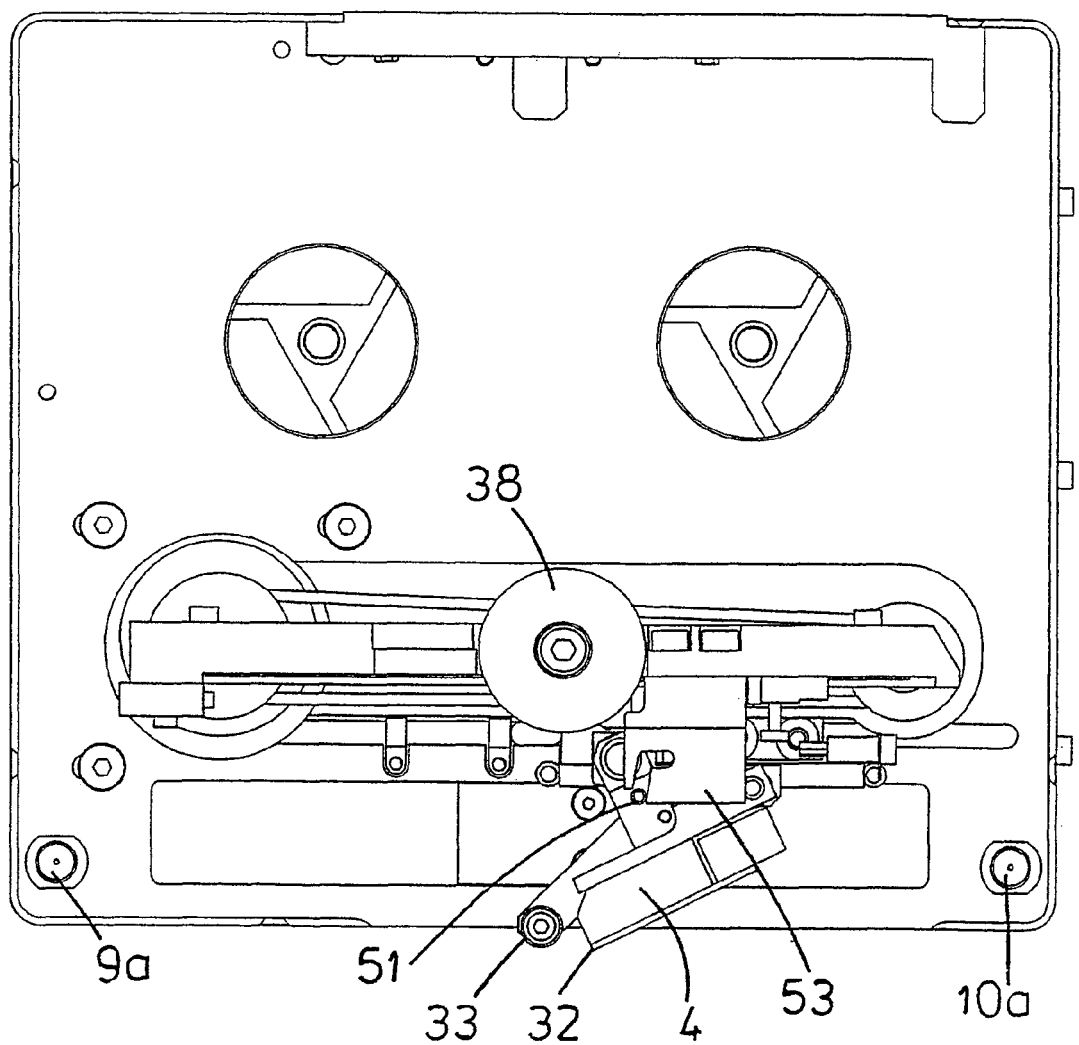
FIG. 12 is a view of the drive assembly after conversion using the alternative print head support of FIG. 11.

In the exemplary embodiment as illustrated in FIGS. 1 to 10, it is intended that a substrate to be printed travels past the print head in the left to right direction with respect to FIG. 5 or the print head when printing travels in the right to left direction with respect to the platen 31 in FIG. 6. The peel-off roller 33 is in all instances positioned on the downstream side of the printing edge 32. There are many circumstances however where such an arrangement is not convenient and it would be desirable to reverse the arrangement so that the relative positions of the edge 32 and the peel off roller 33 are reversed and the disposition of the print head 4 is also reversed. This can readily be achieved with the illustrated apparatus by replacing the print head carriage 36 shown in FIG. 10 with the print head carriage 58 shown in FIG. 11. FIG. 12 illustrates the resultant assembly. It will be noted that the print head carriage 58 of FIG. 11 also defines a socket 59 for receiving the pneumatic drive unit 44 and an opening 60 for receiving the air inlet tube 47. It will also be noted that the print head carriage 58 of FIG. 11 is a mirror image about a vertical plane of the print head carriage 36 of FIG. 10.

Referring to FIG. 12, it will be seen that in addition to reversing the position of the print head 4 and the peel off roller 33, the cam plate 53 has also been rotated through 180° and fitted on the opposite side of the magnet 38 (circular steel keeper) to its position in the embodiment of FIGS. 1 to 10. The arm 43 on which the peel off roller 33 is mounted has also been moved so as to continue to be located adjacent the cover plate 21.

The described printer arrangement provides a number of very significant advantages. Firstly, it is possible to use the same apparatus for both continuous and intermittent printing. Conversion of a production line from one form of printing to another does not therefore mean that new printers must be purchased. Secondly, by making relatively minor modifications involving only one additional component (the alternative print head carriages of FIGS. 10 and 11) the same apparatus can be used for both left hand and right hand applications, using these terms in the sense of FIG. 2 or FIG. 4 (left hand) and FIG. 12 (right hand). Thirdly, ribbon replacement is simple matter given that when in the docked position the print head 4 is automatically pulled back away from the peel-off roller 33 so as to provide a wide track into which a replacement printer ribbon carried on a cassette can be inserted.

Referring to FIGS. 13, 14, 15 and 16, different methods of making efficient use of the printer ribbon using the apparatus described in FIGS. 1 to 12 will be described. All of these methods rely upon the high accuracy within which ribbon can be delivered to the print head so as to minimize ribbon wastage.

Figure 13:
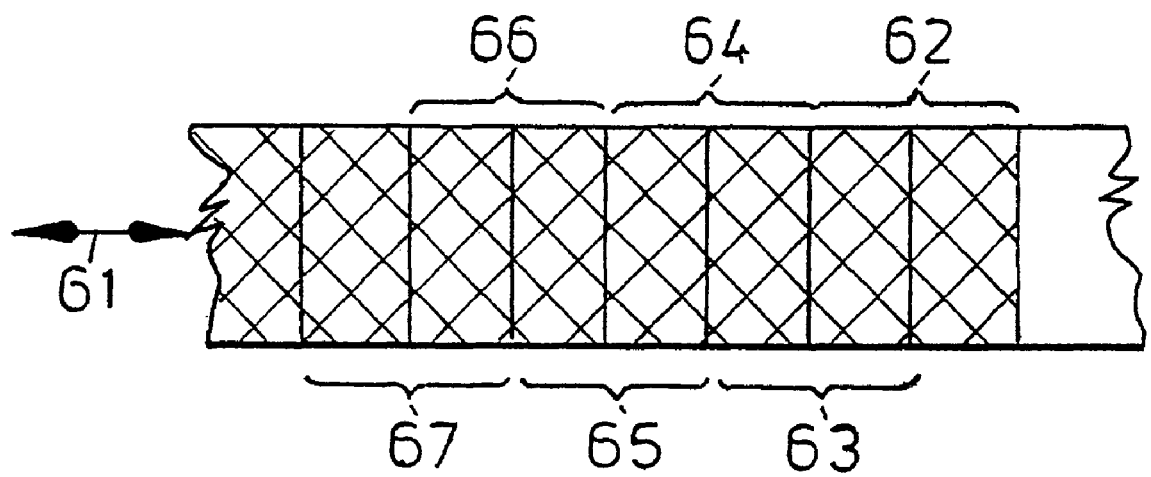
FIGS. 13 to 16 illustrate the use of interleaved printing using the drive assembly of FIG. 2.

Referring to FIG. 13, this is a view of a ribbon the length of which is indicated by arrow 61 and with which six individual printing operations have been performed using overlapping regions of the ribbon. These six regions are indicated as regions 62 to 67, the second half of region 62 overlapping with the first half of region 63, the second half of region 63 overlapping with the first half of region 64 and so on. Assuming printing on a substrate, the region 62 is printed, the ribbon is then advanced by half the length of the regions, the region 63 is printed, the ribbon is then again advanced by half the length of the regions, the region 64 is then printed and so on.

Figure 14:
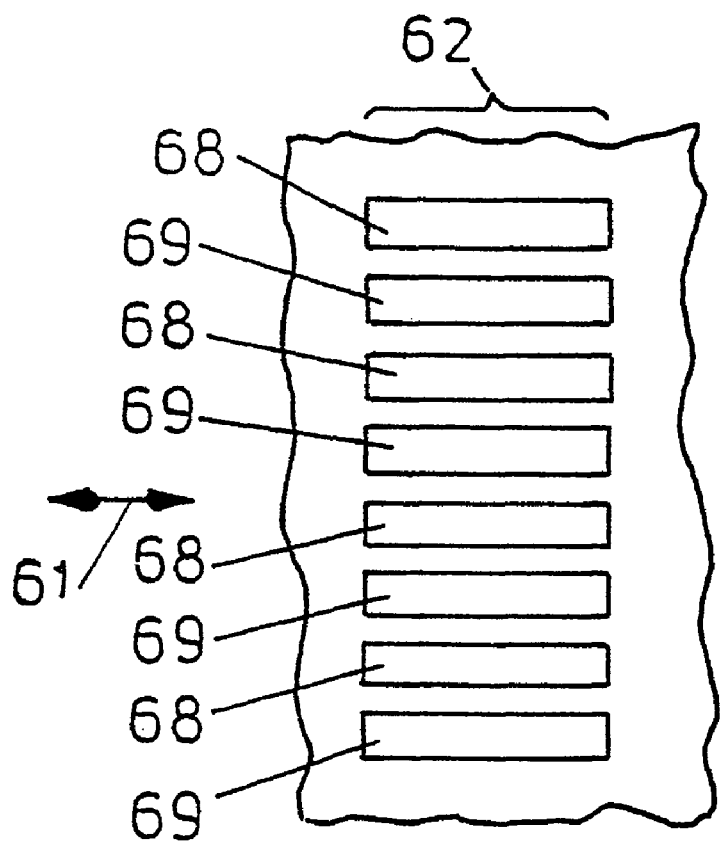

Such overlapping printed regions could be used in both continuous and intermittent printing processes. In the described arrangement, adjacent regions overlap by half the width of each region, but different proportions of overlap could be envisaged. Given that adjacent printing regions overlap, it is important that a region of the ribbon which is overlapped by two adjacent printing regions is used in a manner which ensures that printing progresses only on the basis of using portions of the ribbon which are used in only one of the two overlapping regions. This can be achieved for example by selecting only alternate portions of the ribbon within any one printing region. For example, as illustrated in FIG. 14, if adjacent heating (pixel) elements on the printing head are represented by ribbon areas 68 and 69, ribbon areas 68 would be used in printing one region (for example region 62) and ribbon areas 69 would be used in printing the adjacent region (region 63). In this manner, providing the spacing between adjacent pixels on the print head is small enough to enable an image of reasonable quality to be printed using only alternate pixels, twice the number of images can be generated from a ribbon than would be the case if all the pixel elements were used for printing purposes in a single image and there was no overlap between printing regions. In addition however the distance that the ribbon must be advanced between printing phases in successive printing cycles is reduced by half. This is advantageous as in some applications this enables faster machine operation.

Figure 15:
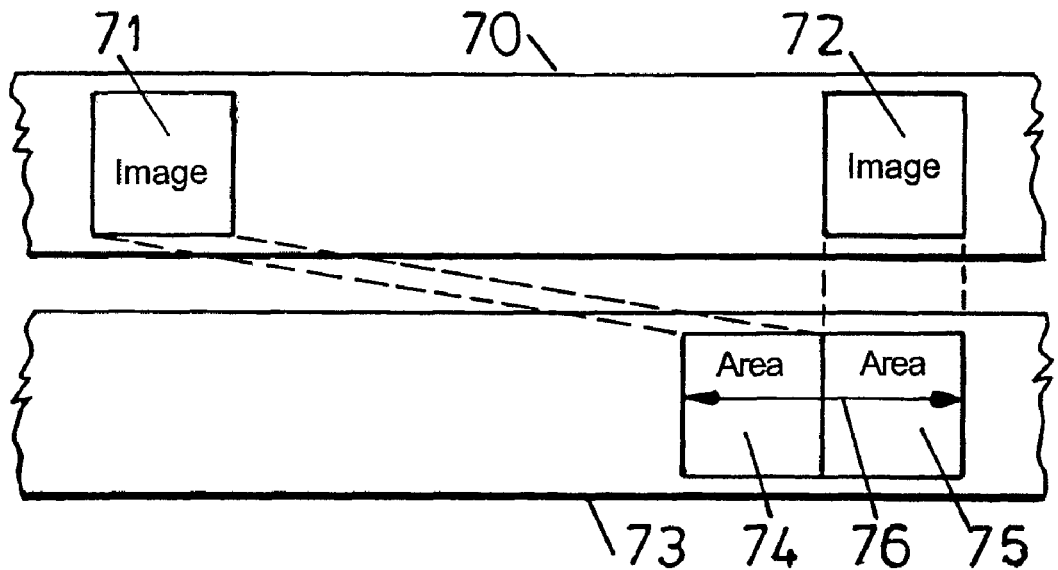
Figure 16:
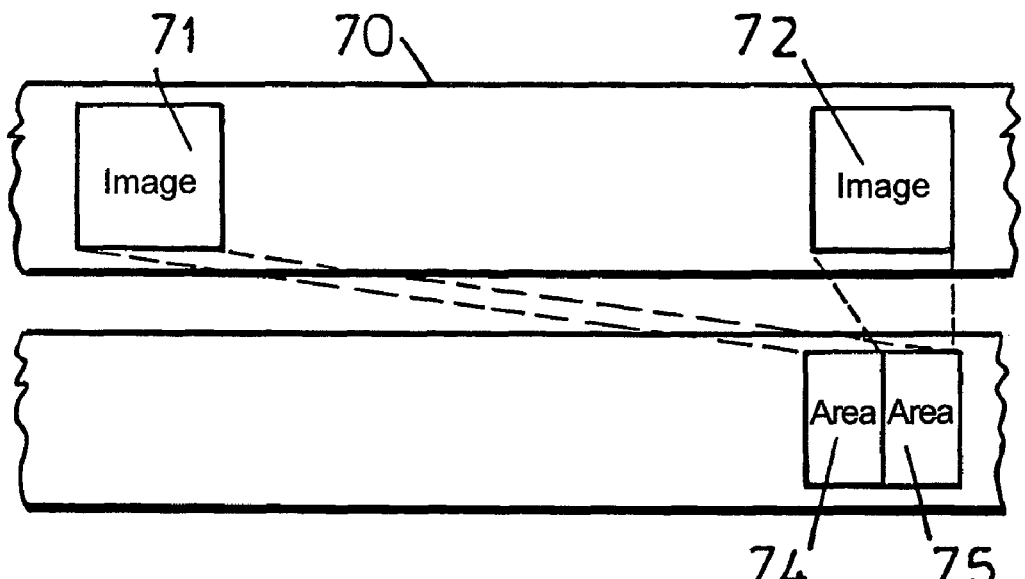

To illustrate this advantage, FIG. 15 shows conventional printing onto a substrate with no overlap between successive cycles whereas FIG. 16 illustrates the same operation relying upon such overlap.

Referring to FIG. 15, a substrate 70 is shown on which successive images 71 and 72 have been printed. Shown beneath the substrate is a print ribbon 73 on which areas 74 and 75 have been used to produce the images 71 and 72. The ribbon transport length is indicated by the arrow 76 and is equal to twice the length of a single image.

Referring to FIG. 16, this shows how overlapping printing can both reduce ribbon usage and reduce the distance of ribbon transport between successive printing phases. It will be seen that each of the areas 74 and 75 in FIG. 16 is only half the length of the corresponding areas in FIG. 15 and the ribbon transport distance is therefore halved. In some applications, where rapid ribbon transport is required, halving the distance that ribbon must be transported between successive printing phases can significantly improve the ability of the device to operate at high speed. It will also be appreciated that more than two groups of printing elements may be used so that in the case of for example three groups the length of required ribbon transport would be only one third of the image length. Thus there would be a trade off between printer ribbon transport length and image quality but this aspect of the exemplary embodiment does give the operator of such equipment increased flexibility which in some applications will be of real economic significance.

The advantages described with references to FIGS. 13 to 16 can only be achieved if the print ribbon can be positioned relative to the substrate and the print head with great accuracy. The conventional approach to achieving accurate control of tape acceleration, deceleration, speed and position has relied upon a capstan roller positioned between feed and supply spools, but the exemplary embodiment relies upon a completely different approach, that is the accurate control of the drive applied to the stepper motors 14 and 15 (FIG. 1) which drive the ribbon spools. The stepper motors operate in push-pull bi-directional mode, that is if the tape is traveling in one direction between the spools both stepper motors are driven in that direction, and conversely when the ribbon is being driven in the opposite direction both stepper motors are driven in that opposite direction. Coordination of the drive to the two stepper motors requires knowledge of the diameters of the spools and this is achieved using the light emitting devices 28 and 29 and the light detecting device 37 as shown in for example FIG. 2.

Figure 17:
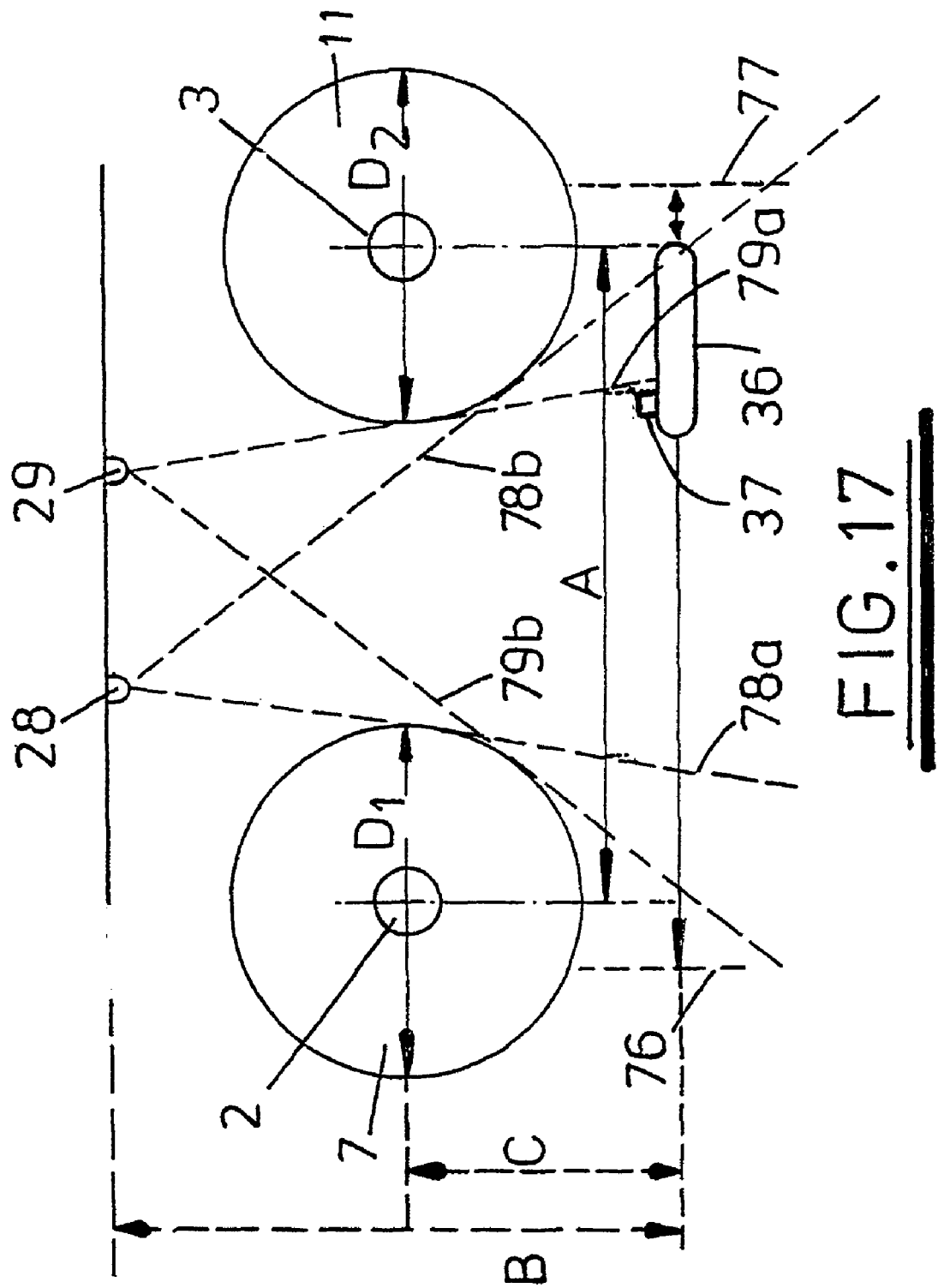
FIG. 17 schematically illustrates the operation of an optical printer ribbon spool diameter measuring system.

FIG. 17 illustrates how the light emitting devices 28 and 29 and the detector 37 are used to determine the spool diameters. The detector 37 is mounted on the print head carriage 36 and is displaceable between the position indicated by line 76a and the position indicated by line 77. As the detector 37 is moved to the right in FIG. 17 from the position indicated by line 76, initially emitter 28 is energized. Initially the detector 37 is in the shadow cast by spool 7, but as soon as the detector 37 crosses the plane indicated by line 78a an output will be generated. That output will disappear as the detector 37 crosses the plane indicated by line 78b. The detector 37 is then advanced to the position indicated by line 77 and then returned after the emitter 28 has been de-energized and the emitter 29 has been energized. Initially the detector 37 will be in the shadow of spool 11 but will generate an output as soon as it reaches the plane indicated by the line 79a. That output will disappear as the detector 37 crosses the plane indicated by the line 79b. The positions relative to the detector displacement at which the detector 37 intersects the planes 78a, 78b, 79a and 79b can thus be determined. The dimension A, that is the distance between the rotation axes of the two spools, is known. The perpendicular distance B between the track followed by the detector 37 and the plane in which the emitters 28 and 29 are located is known, as is the perpendicular distance C from the axes of the shafts 2 and 3 to the track followed by the detector 37. From these dimensions the diameters D1 and D2 of spools 7 and 11 can be derived using simple trigonometry.

Two emitters 28, 29 are used to ensure that for any one spool the detector 37 can "see" the shadow cast by at least one of the emitters regardless of spool diameter size. It will be appreciated however that other dispositions of one or more emitters and one or more detectors could be envisaged.

It will be appreciated that the calculation of the spool diameters would be somewhat simpler if the planes 78a, 78b, 79a and 79b were perpendicular to the direction of displacement of the detector 37. This can be achieved by for example replacing the emitters 28 and 29 with a mirror extending parallel to the direction of displacement of the print head carrier 36 and arranging both a transmitter and a detector on the print head carriage 36, the detector detecting light only when both it and the emitter are on a plane perpendicular to the mirror. Although such an arrangement is simple in terms of the required trigonometry it has disadvantages in that a failure of either the transmitter or detector could be interpreted as the detector being in the shadow of one of the spools.

Given knowledge of the spool diameters, the spools can be driven in push-pull mode so as to achieve high rates of acceleration and deceleration by appropriate control of the speeds of rotation of the two stepper motors. Tension in the ribbon between the two spools must however be closely controlled to avoid the tension becoming too high (resulting in over tightening of the ribbon on the spools or even ribbon breakage) or the tension becoming too low (resulting in loss of positional control as a result of the ribbon becoming slack). To avoid this occurring, changes in spool diameters over time are monitored by reference to the stepper motors and tension in the ribbon is directly monitored by reference to the current drawn by the stepper motors.

In one embodiment, when a fresh cassette is fitted onto an apparatus such as that described with reference to FIGS. 1 to 10, one of the cassette shafts will support an almost empty spool (the take-up spool) and the other will support an almost full spool (the supply spool). The stepper motor associated with the take-up spool will be referred to below as the take-up motor and the other stepper motor will be referred to as the supply motor.

Initially the take-up motor is energized to remove any slack from the length of ribbon extending between the two spools. A print head scan is then conducted with the optical system described with reference to FIG. 17 to obtain an initial estimate of the diameters of the spools. The supply motor is then energized in order to tension the ribbon extending around the supply spool. The take-up motor is then driven so as to draw ribbon from the supply spool, the supply spool being de-energized. The number of steps taken by the motor driving the take-up spool is monitored. The other motor is not stopped, but generates a back-emf resulting in the generation of pulses that are counted. After a few turns of the spools the number of steps taken by the take-up motor and the number of pulses generated by the supply spool motor are counted and the counted numbers are used to establish the ratio between the two diameters. The ribbon is then brought to a controlled halt. Both motors are decelerated in a controlled manner to avoid overrun. Thus the supply spool motor is driven by pulses to cause deceleration. The application of deceleration pulses to the supply spool motor in synchronism with motor rotation is achieved by monitoring the back-emf generated in one winding of that motor, and then energizing that winding at an appropriate time to apply a decelerating torque. A number of rotations of the take-up spool are required to minimize the chance of any tails of ribbon extending from the spools obstructing the optical paths of the scanning arrangement as illustrated in FIG. 17. A further optical scan is then performed in both directions to determine the radius of the take-up spool while that spool is stationary. An optical scan is then repeated as the spool is rotated in 30° increments around the stepper motor shaft by stepping the motor by the appropriate number of steps, that number being a constant. This builds up a map of the dimensions of the spool (which may not be perfectly circular) and this map is used to calculate the average radius for each spool for the arc that each will rotate in each ribbon feed and further use these radii to calculate variations in diameter around the spool axes. This makes it possible to accurately determine the circumference of each spool and the effect of a predetermined number of steps in advance of the motor driving that spool. For example the different calculated radii can be used to calculate the step rate and the number of steps required by each motor to drive the spools in an appropriate manner so as to feed the ribbon a predetermined distance. These radii and step rates may then be used in tension monitoring calculations such as those described below.

The same optical scan procedure is then performed in both directions to measure the radius of the supply spool. This information is then combined with the previously calculated ratio of spool diameters to give an accurate set of data related to the spool diameters and shapes. Ribbon fed from the supply spool to the take-up spool is then rewound back onto the supply spool so as to avoid ribbon wastage.

Stepper motors generally comprise two quadrature-wound coils and current is supplied in a sequence of pulses to one or both of the coils and in both senses (positive and negative) so as to achieve step advance of the motor shafts. In order to achieve a reasonable performance despite the inherent electrical time constant of these coils it is well known to overdrive stepper motors by applying a voltage that is much larger than the nominal rating of the motor and to pulse width modulate this voltage when the desired motor current is reached. For example, with a 3.6 volt motor capable of taking say 2 amps, a voltage of 36 volts may be applied. This results in a very rapid rise in current through the motor, typically in a few tens of micro seconds. Given such overdriving of the supply voltage, relatively short periods of supply voltage application are separated by relatively long periods during which no supply voltage is applied. As a result current from the supply to the motors is very far from smooth. In addition, even when a motor is operating with zero load relating to the function that it performs (equating to zero tension in the printer ribbon), the supply current to the motor will be a function of various factors such as the speed of rotation of the motor, the particular characteristics of that motor (efficiency etc.), and the particular characteristics of the motor drive circuitry (gain and offset variances). It is necessary therefore to calibrate the motors to take account of current variation related to these factors rather than motor load.

The motors are calibrated by driving each of them in zero-load conditions at each of a series of different speeds, for example at speeds corresponding to 125 steps per second, 250 steps per second, 375 steps per second and so on in increments of 125 steps per second up to 5000 steps per second. This will generally cover the range of ribbon speeds required for ribbon advancement, that range generally being from 100 mm per second to 600 mm per second ribbon transport speed. This process is repeated a number of times, for example twenty times, and the average result is used to calculate a motor calibration factor x for each step rate, and for each motor. The following relationship is used:

$$x = N/V$$

Where:

x is the calibration factor for the motor at the given step rate.

V is the average measured motor operation value at the given step rate.

N is a constant normalization or scaling factor.

From the above for each motor a series of values x is calculated for each of the predetermined step rates. When the apparatus is in use, for a given step rate one of the values x is selected for use in the calculation of ribbon tension, or a value for x is calculated for the given step rate by interpolation from the two values of x for the predetermined step rates closest to the given rate.

Figure 18:
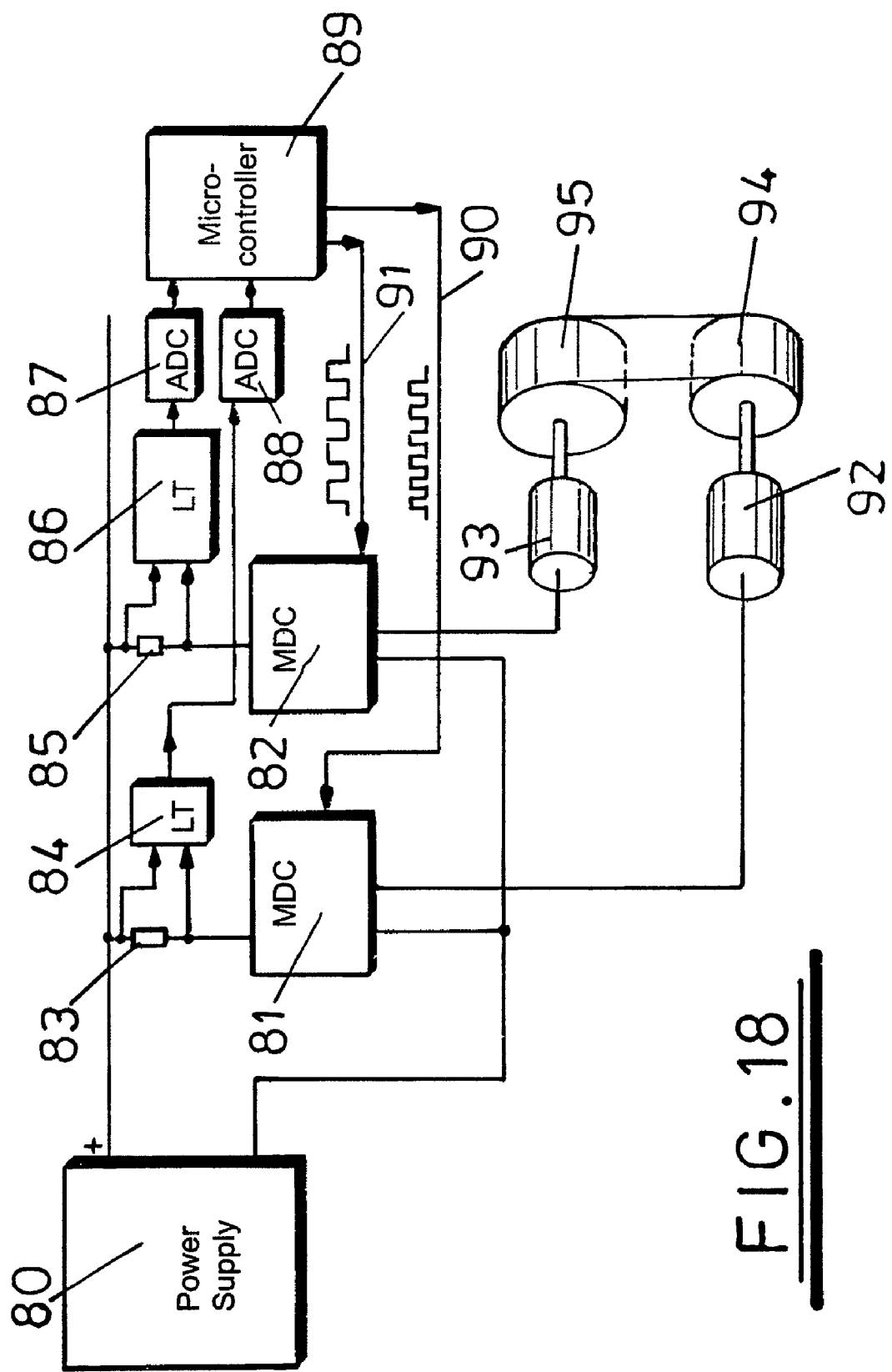
FIG. 18 is a schematic illustration of a circuit for monitoring the power consumed by stepper motors incorporated in the drive assembly of FIG. 2.

FIG. 18 illustrates the calculation of the values V both during motor calibration and in subsequent ribbon tension control. Referring to FIG. 18, a regulated power supply 80 energizes a first motor drive circuit 81 (MDC) and a second motor drive circuit 82 (MDC). Current from the supply 80 to the motor drive circuit 81 is delivered through a low resistance resistor 83, the potential developed across the resistor 83 being applied to a level translator 84 (LT). Similarly, current to the motor drive 82 is delivered through a low resistance value resistor 85 and the voltage developed across that resistor is applied to a level translator 86 (LT). The outputs of the level translators 84 and 86 are applied to analog to digital converters 87 and 88 (ADCs) the outputs of which are applied to a microcontroller 89. The microcontroller delivers a pulsed output 90 to the first motor drive 81 and a pulsed output 91 to the second motor drive 82. The motor drives energize stepper motors schematically represented by cylinders 92 and 93 which drive respective spools 94 and 95.

During motor calibration, no spools are mounted on the outputs of the stepper motors 92 and 93. For a given step rate for each motor the outputs of the ADCs 87 and 88 are recorded such that x and V for each motor at each of the preselected step rates is known. Those values are then used as described below to enable direct monitoring of ribbon tension in the ribbon between the spools 94 and 95, these spools having been mounted on the output shafts of the stepper motors 92 and 93.

The formulas used for tension calculation are as follows, assuming that motor 92 is pulling and motor 93 is pushing:

$$V_1 x_1 = (N + r_1 t x_1) f(T) \quad (1)$$

$$V_2 x_2 = (N - r_2 t x_2) f(T) \quad (2)$$

Where:

$V_1$ is the output of ADC 88 given a selected constant step-rate ribbon feed $V_2$ is the output of ADC 87 during ribbon feed $r_1$ is the radius of the spool 94

$r_2$ is the radius of the spool 95

$x_1$ is the calibration factor for motor 92 for the selected constant step rate $x_2$ is the calibration factor for motor 93 for the step rate of motor 93

N is the scaling factor used during motor calibration t is the ribbon tension f(T) is a temperature-related function Temperature variations which will affect the measured values $V_1$ and $V_2$ will generally affect both motors to the same extent. Therefore by dividing equation (1) by equation (2) the functions f(T) will cancel out. The equation can therefore be resolved to derive a measure of tension t as follows:

$$t = N((V_1/x_2) - V_2/x_1))/(V_2 r_1 + V_1 r_2) \quad (3)$$

Thus for any given step rate for the motors, the appropriate calibration factors $x_1$, $x_2$ can be looked up and used to derive a measure of the ribbon tension t. If the derived value of t is too high (above a predetermined limit), then a small step adjustment can be made to either or both of the motors to add a short section of ribbon to the length of ribbon between the spools. If the derived value of t is too low (below a different predetermined limit), then a short section of ribbon can be removed from the length of ribbon between the spools. The control algorithms used to determine the correction amounts of ribbon added to or removed from the length of ribbon between the spools may be of conventional form, for example the algorithms known as proportional integral derivative control algorithms (PID control). The algorithms make it possible to compare the measured tension t with predetermined upper and lower limits (the so-called deadband) and, if the measured tension is outside these limits, the difference between the measured tension t and a "nominal demand" tension which is set at a level between the upper and lower limits may be calculated, the result of that calculation being regarded as an error "signal". This error "signal" is then mathematically processed through the PID algorithms, which include a proportional gain constant, as well as integral and derivative factors. The mathematical processing results in a "correction" amount of ribbon that needs to be added to or removed from the ribbon path between the spools during the next ribbon feed. This addition or removal of ribbon maintains ribbon tension within acceptable limits.

In greater detail, the correction value may be calculated by calculating the error (the difference between the nominal tension and the measured tension) and dividing the error by a gain factor which depends upon the ribbon width. The greater the gain factor the tighter the system will be as the nominal tension will be increased. The gain factor is also dependent upon the ribbon width as the gain constants are changed to take account of different ribbon widths. This is because a tension which might cause considerable stretch in a narrow ribbon would cause minimal stretch in a wide ribbon and therefore the effects of adding or removing ribbon from the length of ribbon between the spools is radically affected by ribbon stiffness. Successive cycles may adjust the gain factor from a value nominally of 100 (tight) to a value of nominally 80 (slack). For every consecutive tight or slack reading after a first reading, an extra 0.1 mm correction can be added. An error accumulator is also maintained, and if the accumulated corrections (which are negative for tight and positive for slack) exceed plus or minus 2 mm then an additional 0.1 mm is added to the correction. These are the two integral components which enable the system to operate in a stable manner and maintain ribbon tension at or close to the nominal tension.

The motor feed system splits the correction evenly between both motors in order to avoid large gaps between prints or over-printing on the ribbon. The system does this by calculating the number of steps that half the correction amounts to for the stepper motor with the largest real diameter. These steps are then re-calculated as a distance (relying upon the known spool diameters) and subtracted from the original correction amount. The resultant value is then used to calculate the correction for the motor driving the smaller diameter spool. Because the motor driving the smaller diameter spool has the smallest step size (when each step is converted to ribbon length) it can most accurately feed the remaining distance. Thus the mechanism adjusts the tension by an amount that is as near as possible to that demanded by the original correction.

It will be appreciated that if a particularly low tension reading is calculated by the above method, this can be taken by the control system as indicating a fault condition, for example ribbon breakage, or the ribbon becoming so slack that the system is most unlikely to be able to effect adequate control. In such circumstances, the control system can output a "broken ribbon" predetermined low limits, such that when the measured tension t falls below this limit, the control system can halt the printing process and assert appropriate fault outputs and warning messages. Thus the system can offer valuable "broken ribbon" detection without the need for additional sensing arrangements.

Figure 19:
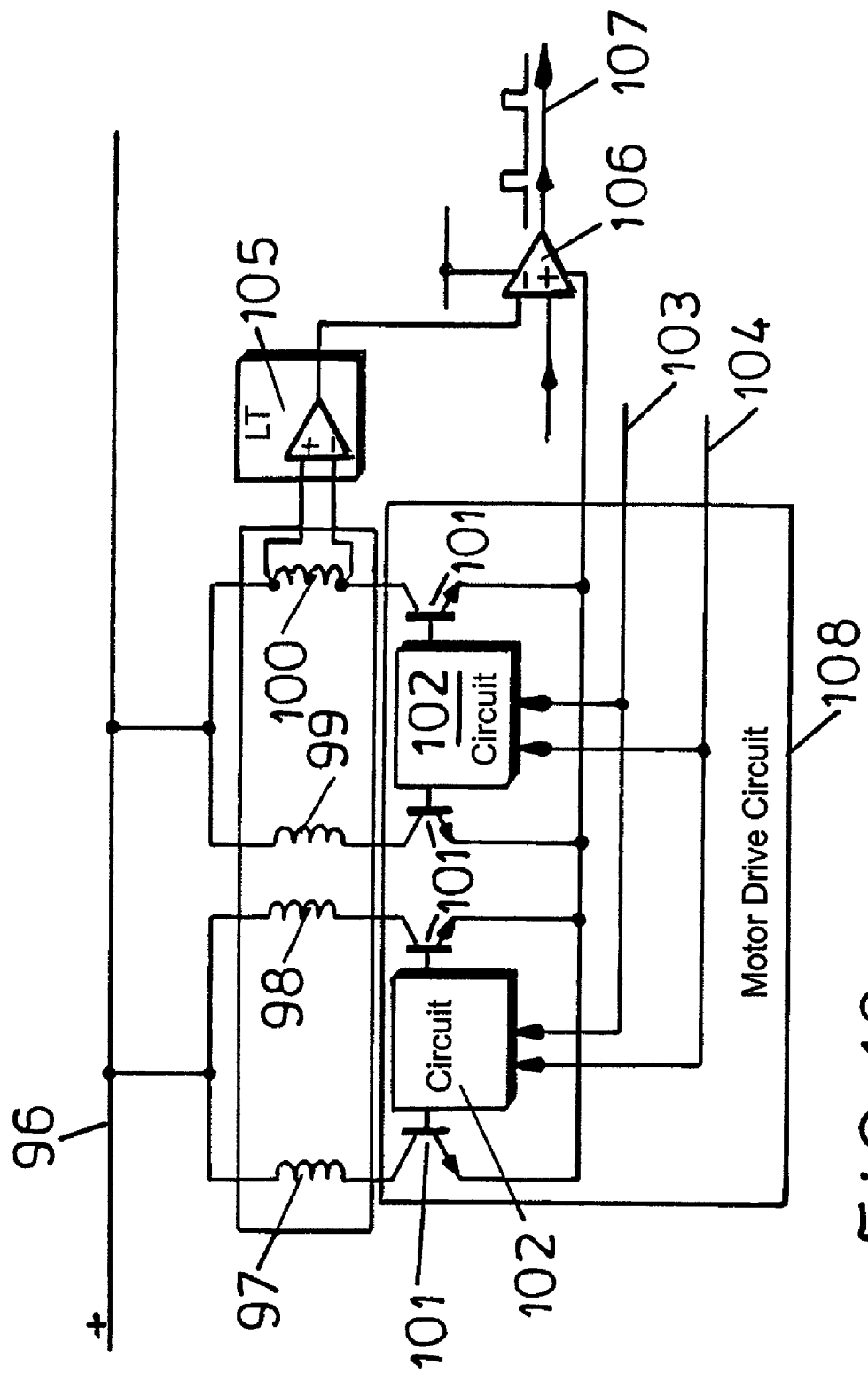
FIG. 19 is a schematic illustration of a circuit for monitoring the charging ratio between the diameters of ribbon spools mounted on the drive assembly of FIG. 2.

FIG. 19 illustrates a circuit for calculating the ratio of the diameters of the spools 94 and 95 in the circuit of FIG. 18. The positive supply rail 96 of the power supply 80 (FIG. 18) is arranged to supply current to four windings 97, 98, 99 and 100. Current is drawn through the windings 97 to 100 by transistors 101 which are controlled by motor control and sequencing logic circuits 102. The step rate is controlled by an input on line 103 and drive is enabled or disabled by an input on line 104 (high value on line 104 enables, low value disables). As before, if motor 92 is pulling, the drive circuit 108 for that motor is enabled and therefore the rotation angle for the spool being driven (94) is known. The drive circuit for the motor being pulled (93) is disabled (line 104 low). Thus motor 93 acts as a generator and a back-emf is generated across each of the motor windings 97 to 100. The components enclosed in box 108 of FIG. 19 corresponds to one of the motor drive circuits 81, 82 of FIG. 18. The voltage developed across the winding 100 is applied to a level translator circuit 105 (LT) the output of which is applied to a zero crossing detector 106 fed with a voltage reference on its positive input. The output of the zero crossing detector 106 is a series of pulses on line 107. Those pulses are delivered to the micro processor 89 of FIG. 18. By counting these pulses from motor 93 over a known rotation angle of the drive motor 92 the spool diameter ratio can be calculated.

The method of monitoring ribbon tension as described with reference to FIG. 18 relies upon sampling current supplied to the motor drives 81 and 82 by sampling voltages developed across series resistors 83 and 85. Preferably current is detected only during periods in which the ribbon has been advanced at a constant speed. In intermittent printing systems, current is monitored during the return stroke of the print head after each printing operation. During print head return, the ribbon is also displaced. Thus the ribbon must be accelerated up to a constant speed, advanced at that constant speed for a period during which the current is monitored, decelerated and then positioned so as to minimize ribbon wastage. Driving a ribbon in this manner during intermittent printing operations is a relatively simply matter as all that is necessary is to ensure that the necessary motion of the ribbon incorporates a period of constant speed displacement during which current can be monitored. In continuous printing apparatus the problem is different as the ribbon is moving at a rate related to the substrate speed. Ribbon speeds of less than 50 mm per second are difficult to utilize as there is a tendency for the ink to cool before it can be securely adhered to the substrate, and a wide range of substrate speeds above 50 mm per second must be catered for. Nevertheless, in order to save ribbon an amount of ribbon will always be returned to the supply spool between successive printing operations. It is necessary to ensure that the ribbon is returned in a manner such that the ribbon travels in the return direction for a sufficient period of time at a constant velocity to enable an accurate measurement of motor currents. It may be that to achieve this it is necessary for the ribbon to be "over-returned" so that before the next printing operation the ribbon has to be advanced to compensate for this over-return. For both continuous and intermittent printing over-return may be used to ensure that sufficient ribbon is transported to provide an accurate measurement during the tension measuring part of each printing cycle.

Preferably the motor currents are sampled over a period of time corresponding to for example the travel of the ribbon through a distance of at least 10 nun at a constant velocity. For example the current could be sampled at regular intervals with the interval between successive samples corresponding to for example one quarter of a step of the motor. The samples are added together and the sum is divided by the number of samples taken. This gives an average current which is reasonably representative of the power being drawn by the associated stepper motor.

An analysis of the waveforms of current supplied to stepper motors in the described embodiment shows that, in addition to the current fluctuations resulting from the pulse width modulated nature of motor control, there is a substantial amount of variation in the waveforms which will mean that individual samples may not be representative of the power being drawn by the motors. A more accurate representation of that power can be obtained if the monitored signals are passed through a low pass filter (not shown) before being averaged.

FIG. 19 illustrates one approach to the monitoring of changing spool diameters during ribbon usage. Alternative approaches are possible however and one such alternative approach is described with reference to FIG. 20.

Figure 20:
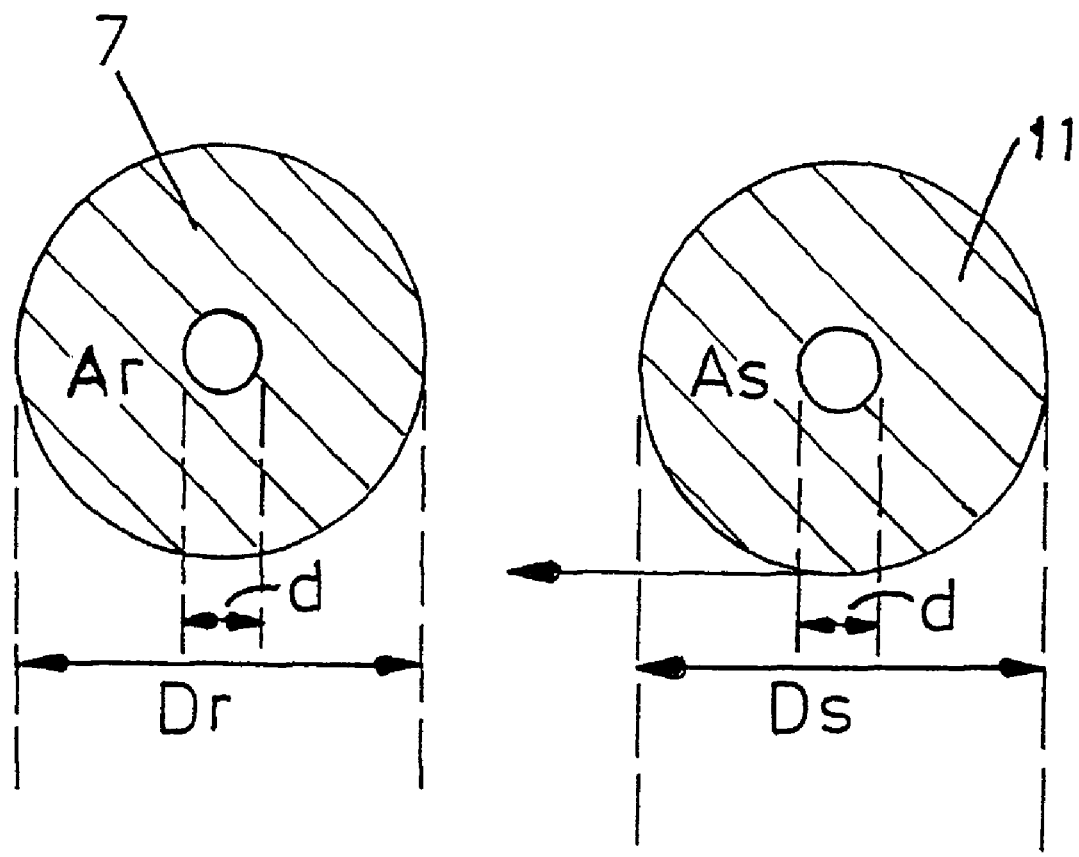
FIG. 20 illustrates an alternative approach to monitoring ribbon spool diameters.

Referring to FIG. 20, $A_r$ and $A_s$ are the areas of spools 7 and 11 (see FIG. 1) respectively, d is the inner diameter of the spools and Dr and Ds are the outer diameters of the spools at any given time. Hence:

$$A_r + A_s = \text{constant} \quad (4)$$

$$A_r = (D_r/2)^2 - (d/2)^2 \quad (5)$$

$$A_s = (D_s/2)^2 - (d/2)^2 \quad (6)$$

Substituting from (5) and (6) into (4) gives:

$$D_r^2 + D_s^2 = \text{constant} = D_{rc}^2 + D_{sc}^2 \quad (7)$$

Where $D_{rc}$ and $D_{sc}$ are rewind and supply spool diameters respectively at initial calibration time.

| | |
|---|---|
| Current diameter ratio | $R = D_r/D_s$ |
| Therefore rearranging this | $D_s = D_r/R$ |
| And also | $D_r = RD_s$ |

Substituting in (7) gives:

$$D_r^2 = D_r^2 / R^2$$
$$= D_{rc}^2 + D_{sc}^2$$
$$= R_c^2 + D_{sc}^2 + D_{sc}^2$$
$$= D_{sc}^2(R_c^2 + 1)$$

where $R_c$ is the ratio of rewind to the supply reel diameter at initial calibration.

Therefore $D_r^2(R^2+1)/R^2 = D_{sc}^2(R_c^2+1)$ and $D_r^2 = [R^2/(R^2+1)][D_{sc}^2(R_c^2+1)]$.

So knowing the initial calibration spool diameters ratio ($R_c$), supply spool diameters ratio ($R_c$), supply spool diameter at calibration ($D_{sc}$) and the current spool diameters ratio (R), the current diameter of either or both spools $D_r$ or $D_s$ can be derived.

In some applications it may be possible only to present a cassette carrying a substantially empty take-up spool and a substantially full supply spool of known outside diameter. In such circumstances it would not be necessary to determine the initial spool diameters. In general however it is to be preferred to directly measure the spool diameters as it is likely that machine operators will at least on occasions use non-standard spool configurations (for example ribbon which has been partially used on an earlier occasion).

As an alternative to the approach described above with reference to FIG. 18 and equations 1 to 3, it is possible to derive an approximation of ribbon tension by relying upon the difference between the currents drawn by the two motors.

This difference current is a function of the magnitude of the tension in the ribbon between the two motors and may be used as a control parameter such that for example, when the magnitude of the difference in current falls outside an acceptable tolerance band, the previously assumed ratio of the spool outside diameters is adjusted, resulting in a small change in the speed at which the two motors are driven. This speed adjustment compensates for the updated spool diameter ratio value. The "optimum" value of the difference current and its tolerance band will change as the spool diameters change. The appropriate value for a particular set of circumstances may be found from experimentation and stored in an optimum difference current profile table which can be looked up as necessary.

No reference has been made in the above description to ribbon width, that is the dimension perpendicular to the direction of ribbon advance. It may be appropriate to provide a user with the option to manually enter a ribbon width value so as to enable the system to adjust the predetermined tolerance limits and PID control gain constants referred to above to take account of tape-width dependent characteristics of the apparatus, e.g. to select different target limits for the measured tension t (equation 3).

As discussed above, in transfer printers it is necessary to accurately position the print head relative to the platen which supports the substrate to be printed if good quality print is to be produced, particularly at high printing speeds. The described exemplary embodiment avoids the need to make these mechanical adjustments to optimize print head angle by making use of the fact that the print head is mounted on a displaceable carriage.

Figure 21:
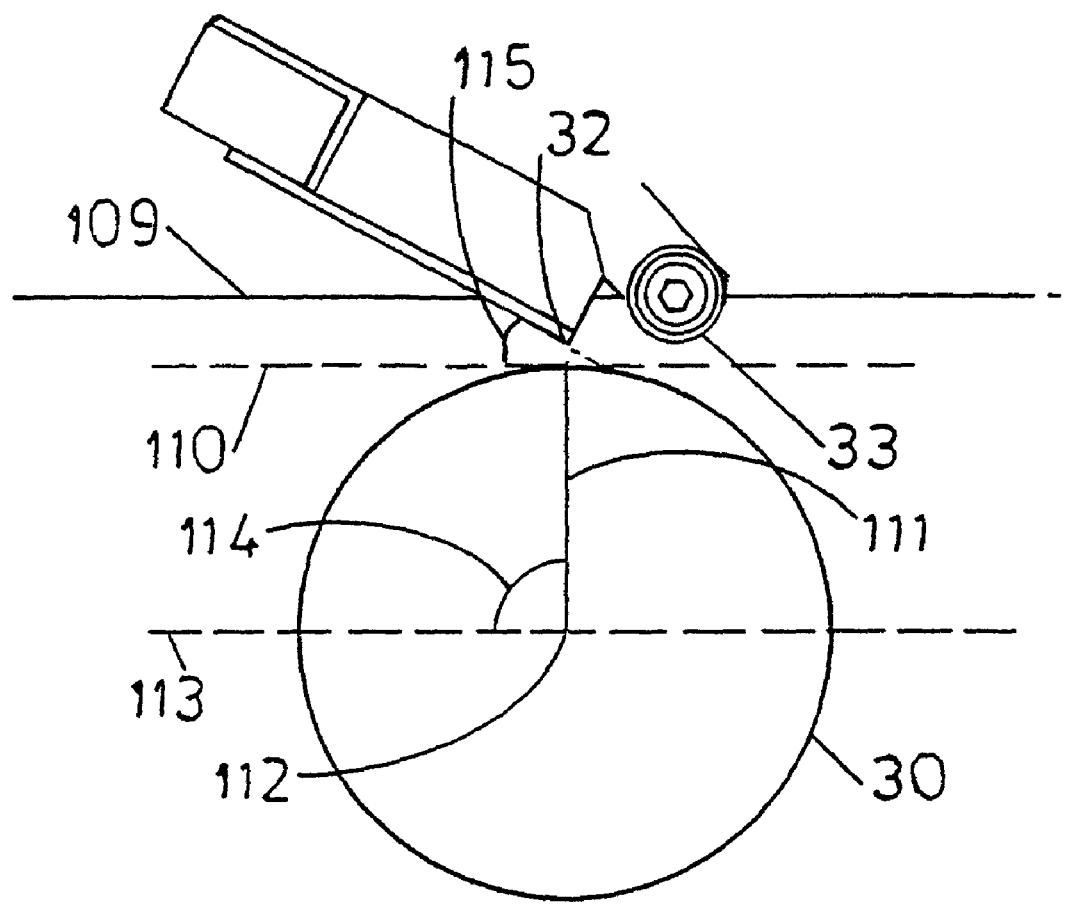
FIG. 21 illustrates the adjustment of print head angle in accordance with the exemplary embodiment.

FIG. 21 shows the roller platen 30, the print head edge 32 and the peel off roller 33 as shown in FIG. 5. The line 109 represents the adjacent edge of the cover plate 21. The broken line 110 represents the position of a tangent to the roller platen 30 at the point of closest approach of the print head edge 32 (it will be appreciated that during printing a substrate and a print ribbon will be interposed between the edge 32 and the roller platen 30). The line 111 represents a radius extending from the rotation axis 112 of the roller platen 30. The line 113 represents a notional line through the axis 112 parallel to the edge 109. The line 113 represents no more than a datum direction through the axis 112 from which the angular position of the radius 111 corresponding to angle 114 can be measured.

Angle 115 is the angle of inclination of the print head relative to the tangent line 110. This angle is critical to the quality of print produced and will typically be specified by the manufacturer as having to be within 1 or 2 degrees of a nominal value such as 30 degrees. Different print heads exhibit different characteristics however and it is desirable to be able to make fine adjustments of say a degree or two of the angle 115.

It will be appreciated that the angle 115 is dependent firstly upon the positioning of the print head on its support structure and secondly by the position of the tangent line 110. If the print head was to be moved to the right in FIG. 21, the angular position of the print head relative to the rotation axis of the roller will change. That angular position is represented by the magnitude of the angle 114. As angle 114 increases, angle 115 decreases. Similarly, if the print head shown in FIG. 21 was to be moved to the left, the angle 114 representing the angular position of the print head relative to the rotation axis of the roller would decrease and the angle 115 would increase. This relationship makes it possible for an installer to make adjustments to the print head angle simply by adjusting the position adopted by the carriage 36 on the track 22 (see FIG. 2) during printing. Thus an installer would initially position the print head so that it would assume a nominal position in which the angle 114 would be approximately 90 degrees. A test print run would then be used to assess print quality, the print head would be displaced relative to the track, a fresh print run would be conducted, and so on until the resultant print quality was optimized. There is no requirement for the installer to make mechanical adjustments to the position of the print head on its support.

Figure 22:
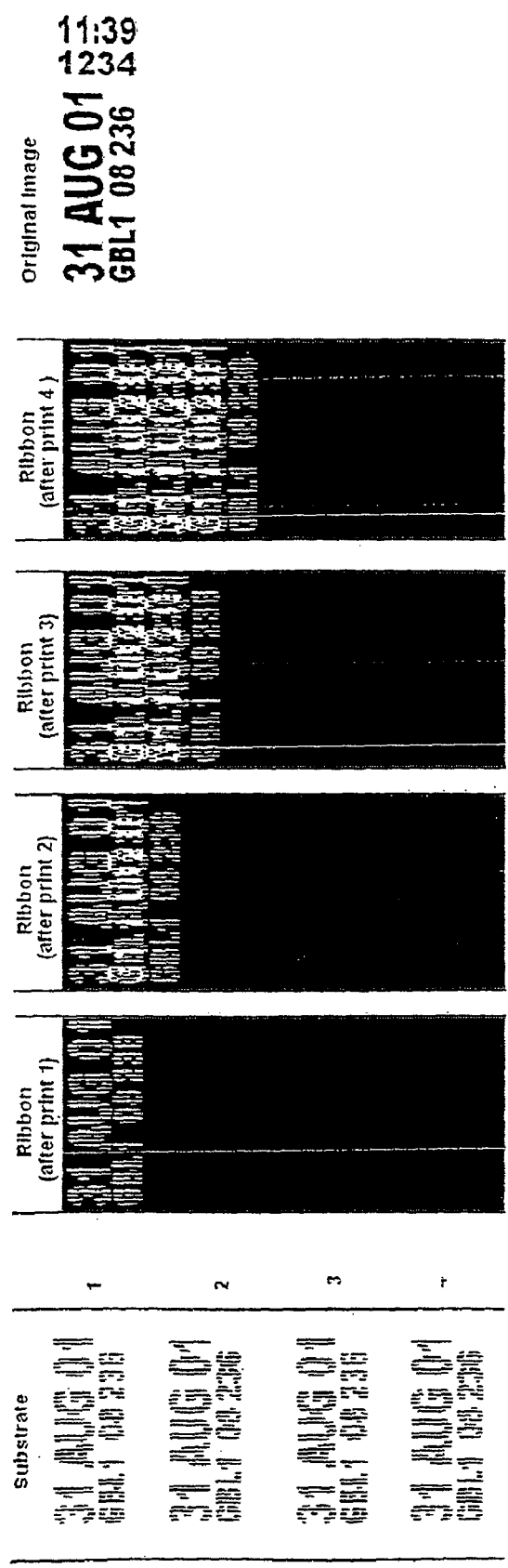
FIG. 22 illustrates the use of an apparatus in accordance with the exemplary embodiment to produce images while relying upon only limited printer ribbon advance.

The printing methods described with reference to FIGS. 13 to 16 make it possible to increase printing speed by reducing the distance that the printer ribbon has to be advanced between successive printing phases in successive printing cycles. FIG. 22 illustrates the appearance of a printed substrate at the left hand side, and the appearance of an associated printer ribbon after first, second, third and fourth printing operations respectively. It will be seen that alternate images are made up of slightly offset printed lines, that offset making it possible for the printer head to traverse the printer ribbon as described with reference to FIGS. 13 and 16 such that successive images are generated in part from overlapping portions of the printer ribbon. The speed of advance of the printer ribbon for a given substrate speed and image reproduction rate can be doubled. In this context, the term "printing cycle" is used to refer to a full cycle of activity which is performed in the interval between a printer head being first pressed into contact with a printer ribbon so as to transfer ink from that ribbon to start the formation of a first image until the print head is again brought into contact with the printer ribbon so as to initiate the transfer of ink which will form a second image. If the printing cycle relates to a continuous printing machine, a full printing cycle includes an initial printing phase in which the print head is stationary and the printer ribbon is transported with the substrate to be printed past the print head, and a subsequent non-printing phase during which the substrate continues to be transported past the printing head, the print head is retracted from contact with the print ribbon, the direction of transport of the print ribbon is reversed, and then the print ribbon is again fed forward until it is traveling in the direction of the substrate, whereafter the printing phase of the next printing cycle is initiated. In an intermittent printer, the printing cycle is initiated with the substrate and ribbon stationary (unless the system is relying upon slip printing), the print head is advanced across the ribbon and substrate during a printing phase of the cycle, the print head is then retracted from the print tape and returned to its initial position, and the substrate and printer ribbon are advanced in readiness for the initiation of the next print cycle.

Thus, during the printing phase of each printing cycle, the print head traverses a predetermined length of ribbon either as a result of displacement of the print head relative to a stationary or slower moving print ribbon, or as a result of displacement of the print ribbon relative to the print head. Thereafter the print ribbon is advanced a predetermined distance. The magnitude of that predetermined distance of ribbon advance is in many applications a limiting factor on the maximum speed of the overall apparatus. In known printers the predetermined distance of ribbon advance is generally at least as long as the predetermined length of ribbon which is traversed by the print head. The described apparatus makes it possible to operate in a manner in which the predetermined distance of ribbon advance is less than the predetermined length of ribbon traversed by the print head.

Referring to FIG. 22, the left hand side of the Figure shows four successive images deposited on a substrate, each image being the same. The right hand section of FIG. 22 shows the original image which has to be reproduced on the substrate.

The four intervening sections illustrate the appearance of the print ribbon after the printing of the four images shown on the left hand side of FIG. 2. Assuming operation in intermittent printing mode, the substrate is advanced by an equal distance between each of the successive printing cycles. The substrate is stationary during each printing cycle, as is the ribbon. Each printing cycle includes an initial printing phase during which the print head is swept across the print ribbon so as to traverse a length of the ribbon corresponding to the length of the image formed on the substrate, followed by a further phase in which the print head is returned to its original position and the ribbon is advanced a distance corresponding to half the length of the ribbon which is swept by the print head during the printing phase. During that first printing phase, only half of the printing elements supported by the print head are energized, and thus the image deposited on the substrate is in the form of a series of parallel lines. During the next printing phase, the print head is again swept across the tape through a distance corresponding to the length of the image, but during that motion printing elements of the print head are energized which contact different parts of the tape from those contacted by energized printing elements during the first printing cycle. At the end of the second printing cycle, the print head is again returned to its initial position and the ribbon is advanced by half the length of the image formed on the substrate. Counting from the left in FIG. 22, the second, third, fourth and fifth sections of this Figure show the appearance of the print ribbon after each of the first, second, third and fourth print cycles have been completed. It will be noted that all of the images formed on the substrate are substantially the same, the only difference between successive images on the substrate being that one is made up of lines offset relative to lines forming the adjacent image.

The output represented in FIG. 22 is produced using a print head in which the print elements are arranged in a linear array with the odd numbered printing elements in the array being allocated to one group and the even numbered print elements in the array being allocated to the other group. This makes it possible to alternate between the groups so that the distance advanced by the ribbon during each printing cycle is only half of the length of ribbon from which ink is released during each cycle. It will be appreciated that the printing elements could be arranged in three, four or more groups, the groups being energized in a predetermined cycle such that for example in the case of a three group arrangement the distance advanced by the ribbon in each printing cycle could be only one third of the length of printer ribbon swept by the print head in any one cycle.

Although this aspect of the exemplary embodiment has been described in detail in the context of intermittent printing, it will be appreciated that the same technique could be applied to a continuous printing apparatus in which relative movement between the printing ribbon and the print head is the result of transport of the ribbon past a stationary head rather than transport of a print head relative to a stationary ribbon.

What is claimed is:

1. A tape drive for a transfer printing apparatus in which tape is selectively transported past a print head for transferring material on the tape onto a substrate intended to receive printing, the tape drive comprising:

two stepper motors, each motor having a rotor shaft and being operable to rotate its rotor shaft in discrete angular steps upon command;

two tape spool supports on which spools of tape are to be mounted, each spool support being rotatable by the rotor shaft of a respective one of the motors;

a controller controlling energization of the motors to selectively transport tape extending between the spools;

with the controller energizing both motors to selectively rotate one of the motors for one or more angular steps in a direction of rotation to rotate its respective spool of tape for supplying tape in a tape transport direction, and to selectively rotate the other motor for one or more angular steps in a direction of rotation to rotate its respective spool of tape for taking up tape for tape transport, thereby moving the tape between the spools in a tape transport direction;

a monitor monitoring a parameter indicative of the diameter of at least one of the spools of tape; and with the controller controlling the number of steps each motor advances during a tape transport operation based at least in part on the parameter indicative of spool diameter to transport the tape between the spools a predetermined distance so as to position a second region of tape, from which material is to be transferred and that is adjacent to a first region of tape from which at least some material has been previously transferred, at the print head for transferring at least some material from the second region of tape to the substrate for efficient usage of the tape.

2. The tape drive of claim 1, wherein the motors are operable to rotate their rotor shafts in either direction of rotation and the controller controls the motors to selectively transport the tape in opposite directions of movement to enable continuous printing using the printing apparatus, in which the substrate and the tape move together and the print head is held in a generally fixed position during the transfer of the material on the tape to the substrate.

3. The tape drive of claim 1, wherein the controller controls the motors to selectively advance the tape the predetermined distance for intermittent printing, in which the substrate and the tape are held in a generally fixed position and the print head moves relative to the substrate and the tape during the transfer of the material on the tape to the substrate.

4. The tape drive of claim 2, wherein the controller controls the motors to selectively advance the tape the predetermined distance during the transfer of the material on the tape to the substrate for a continuous printing operation.

5. The tape drive according to claim 1, wherein the predetermined distance that the controller controls the motors to transport the tape sets an amount of tape between the first and second regions of the tape.

6. The tape drive according to claim 5, wherein the predetermined distance that the controller controls the motors to transport the tape is chosen to minimize the quantity of tape between the first and second regions of the tape.

7. The tape drive according to claim 1, wherein the first region of tape comprises portions from which material on the tape has been transferred to the substrate and the second region of tape comprises portions from which material is to be transferred to the substrate, and wherein the first region of tape and the second region of tape at least partially overlap, but with the portions of the first region of tape being spaced apart from the portions of the second region of tape.

8. The tape drive according to claim 7, wherein the portions of the first region of tape are spaced from the portions of the second region of tape with respect to a longitudinal direction of the tape.

9. The tape drive according to claim 7, wherein the portions of the first region of tape are spaced from the portions of the second region of tape with respect to a lateral direction of the tape.

10. The tape drive of claim 1, wherein said monitor monitors a first parameter indicative of the diameter of a first of the spools of tape and a second parameter indicative of the diameter of a second of the spools of tape and the controller controls the number of steps each motor advances based at least in part upon said first and second parameters.

11. A tape drive according to claim 1 wherein the first region has a length dimension along a longitudinal direction of the tape corresponding to a length dimension of an image printed on the substrate from material transferred from the first region of the tape and the second region has a length dimension along the longitudinal direction of the tape corresponding to a length dimension of an image printed on the substrate from material transferred from the second region of the tape.

12. A transfer printing apparatus comprising:
a print head for transferring material on a tape onto a substrate intended to receive printing;
a tape drive for selectively transporting tape past the print head;
the tape drive comprising:
two stepper motors, each motor having a rotor shaft and being operable to rotate its rotor shaft in discrete angular steps upon command;
two tape spool supports on which spools of tape are to be mounted, each spool support being rotatable by the rotor shaft of a respective one of the motors;
a controller controlling energization of the motors to selectively transport tape extending between the spools;
with the controller energizing both motors to selectively rotate one of the motors for one or more angular steps in a direction of rotation to rotate its respective spool of tape for supplying tape in a tape transport direction, and to selectively rotate the other motor for one or more angular steps in a direction of rotation to rotate its respective spool of tape for taking up tape for tape transport, thereby moving the tape between the spools in the tape transport direction;
a monitor monitoring a parameter indicative of the diameter of at least one of the spools of tape; and
with the controller controlling the number of steps each motor advances during a tape transport operation based at least in part on the parameter indicative of spool diameter to transport the tape between the spools a predetermined distance so as to position a second region of tape, from which material is to be transferred and that is adjacent to a first region of tape from which at least some material has been previously transferred, at the print head for transferring at least some material from the second region of tape to the substrate for efficient usage of the tape.

13. The transfer printing apparatus of claim 12, wherein the motors are operable to rotate their rotor shafts in either direction of rotation and the controller controls the motors to selectively transport the tape in opposite directions of movement to enable continuous printing using the printing apparatus, in which the substrate and the tape move together and the print head being in a generally fixed position during the transfer of the material on the tape to the substrate.

14. The transfer printing apparatus of claim 12, wherein the controller controls the motors to selectively advance the tape the predetermined distance between successive printing operations for intermittent printing in which the substrate and the tape are held in a generally fixed position during the transfer of the material on the tape to the substrate.

15. The transfer printing apparatus of claim 13, wherein the controller controls the motors to selectively advance the tape the predetermined distance during the transfer of the material on the tape to the substrate for a continuous printing operation.

16. The transfer printing apparatus of claim 12, further comprising a tape cassette having a spool of tape and a base member, with the spool supports being mounted on the base member for rotation about axes at spaced locations from each other.

17. The transfer printing apparatus of claim 16, wherein the tape cassette further includes a pair of guides on the base member at spaced locations for engaging and guiding the tape as it moves between the spools.

18. The transfer printing apparatus of claim 12, wherein said monitor monitors a first parameter indicative of the diameter of a first of the spools of tape and a second parameter indicative of the diameter of a second of the spools of tape and the controller controls the number of steps each motor advances based at least in part upon said first and second parameters.

19. A method of operating a transfer printing apparatus having a print head for transferring material on the tape onto a substrate intended to receive printing and a tape drive for selectively moving tape past the print head comprising a pair of stepper motors, each motor having a rotor shaft and being operable to rotate its rotor shaft in discrete angular steps upon command, a pair of tape spool supports on which spools of tape are to be mounted, each spool support being rotatable by a respective one of the motors, a pair of tape spools, with each tape spool being carried on a respective one of the spool supports and with tape extending between the spools, and a controller controlling energization of the motors to selectively transport tape extending between the spools, the method comprising;
energizing both motors to selectively rotate one of the motors for one or more angular steps in a direction of rotation to rotate its respective spool of tape for supplying tape in a tape transport direction, and to selectively rotate the other motor for one or more angular steps in a direction of rotation to rotate its respective spool of tape for taking up tape for tape transport, thereby moving the tape between the spools in a tape transport direction;
monitoring a parameter indicative of the diameter of at least one of the spools of tape;
controlling the number of steps each motor advances during a tape transport operation based at least in part on the parameter indicative of spool diameter to transport the tape between the spools a predetermined distance so as to position a second region of tape, from which material is to be transferred and that is adjacent to a first region of tape from which at least some material has been previously transferred, at the print head; and
transferring at least some material from the second region of tape to the substrate for efficient usage of the tape.

* * * * *